US011734977B2

(12) United States Patent
Budman et al.

(10) Patent No.: US 11,734,977 B2
(45) Date of Patent: *Aug. 22, 2023

(54) MACHINE LEARNING-BASED PLATFORM FOR USER IDENTIFICATION

(71) Applicant: TruU, Inc., Palo Alto, CA (US)

(72) Inventors: Lucas Allen Budman, Denver, CO (US); Amitabh Agrawal, Superior, CO (US); Andrew Weber Spott, Boulder, CO (US); Michael Ross Graf, Lakewood, CO (US)

(73) Assignee: TruU, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,517

(22) Filed: Oct. 6, 2022

(65) Prior Publication Data
US 2023/0033188 A1 Feb. 2, 2023

Related U.S. Application Data

(63) Continuation of application No. 17/351,108, filed on Jun. 17, 2021, now Pat. No. 11,514,739, which is a (Continued)

(51) Int. Cl.
H04N 5/44 (2011.01)
G07C 9/22 (2020.01)
(Continued)

(52) U.S. Cl.
CPC ............ G07C 9/22 (2020.01); G06N 20/00 (2019.01); G07C 9/28 (2020.01); H04L 63/0272 (2013.01); H04W 12/63 (2021.01); H04W 12/64 (2021.01)

(58) Field of Classification Search
CPC . G07C 9/22; G07C 9/28; G06N 20/00; H04L 63/0272; H04W 12/63; H04W 12/64
See application file for complete search history.

(56) References Cited

U.S. PATENT DOCUMENTS 8,643,475 B1 * 2/2014 Kohno ............. G06K 19/07345
340/10.5
9,578,024 B2 * 2/2017 Cheng ..................... H04L 63/12
(Continued)

OTHER PUBLICATIONS

European Patent Office, Extended European Search Report and Opinion, European Patent Application 19851777.3, dated Mar. 7, 2022, 11 pages.
(Continued)

Primary Examiner — Munear T Akki
(74) Attorney, Agent, or Firm — Fenwick & West LLP

(57) ABSTRACT

A system and method are disclosed for identifying a user based on the classification of user movement data. An identity verification system receives a sequence of motion data from a mobile device operated by a target user. From the sequences of motion data, the identity verification system identifies a plurality of identity blocks representing different movements performed by the target user and encodes a set of signature sequences from each identity block into a feature vector. Each feature vector is input to a confidence model to output an identity confidence value for an identity block. An identity confidence value describes a confidence that the movement in the identity block was performed by the target user. The identity confidence value is compared to an operational security threshold and if identity confidence value is above the threshold, the target user is granted access to an operational context.

20 Claims, 13 Drawing Sheets

Related U.S. Application Data continuation of application No. 16/897,174, filed on Jun. 9, 2020, now Pat. No. 11,069,165, which is a continuation of application No. 16/550,112, filed on Aug. 23, 2019, now Pat. No. 10,713,874.

(60) Provisional application No. 62/722,701, filed on Aug. 24, 2018.

(51) Int. Cl.
*G06N 20/00* (2019.01)
*G07C 9/28* (2020.01)
*H04L 9/40* (2022.01)
*H04W 12/64* (2021.01)
*H04W 12/63* (2021.01)

(56) References Cited

U.S. PATENT DOCUMENTS

| | | | |
|---|---|---|---|
| 2008/0192005 A1 | 8/2008 | Elgoyhen et al. | |
| 2010/0214216 A1* | 8/2010 | Nasiri | G06F 3/0485 345/158 |
| 2010/0328201 A1* | 12/2010 | Marvit | G06F 3/0346 382/103 |
| 2014/0049361 A1* | 2/2014 | Ahearn | H04W 12/64 340/5.7 |
| 2014/0333524 A1 | 11/2014 | Liu et al. | |
| 2015/0112603 A1* | 4/2015 | Zhong | G06V 40/25 702/19 |
| 2015/0264572 A1 | 9/2015 | Turgeman | |
| 2015/0325066 A1* | 11/2015 | Müller | G07C 9/20 340/5.61 |
| 2015/0347734 A1 | 12/2015 | Beigi | |
| 2016/0182503 A1 | 6/2016 | Cheng et al. | |
| 2017/0035327 A1 | 2/2017 | Yuen et al. | |
| 2017/0038848 A1* | 2/2017 | Yuen | A61B 5/6802 |
| 2017/0140141 A1 | 5/2017 | Yan et al. | |
| 2017/0148243 A1* | 5/2017 | Shin | G07C 9/00309 |
| 2017/0337364 A1 | 11/2017 | Whaley et al. | |
| 2018/0048645 A1 | 2/2018 | Ionita | |
| 2018/0268628 A1* | 9/2018 | Jain | G07C 9/00309 |

OTHER PUBLICATIONS

PCT International Search Report and Written Opinion, PCT Application No. PCT Application No. PCT/US2019/048031, dated Nov. 8, 2019, 13 pages.

United States Office Action, U.S. Appl. No. 16/897,174, filed Nov. 2, 2020, 6 pages.

* cited by examiner

MACHINE LEARNING-BASED PLATFORM FOR USER IDENTIFICATION

CROSS REFERENCE TO RELATED APPLICATIONS

This application is a continuation of co-pending U.S. application Ser. No. 17/351,108, filed on Jun. 17, 2021, which is a continuation of U.S. Pat. No. 11,069,165, issued on Jul. 20, 2021, which is a continuation of U.S. Pat. No. 10,713,874, issued on Jul. 14, 2020, which claims the benefit of U.S. Provisional Application No. 62/722,701, filed on Aug. 24, 2018, each of which is incorporated by reference in its entirety.

TECHNICAL FIELD

This disclosure relates generally to techniques for user identification, and more specifically to techniques for user identification based on activity data received from a variety of sources.

BACKGROUND

Physical and digital security systems rely on technologies and techniques that are antiquated in today's world. In the digital world, passwords only prove that an individual knows a password. In the physical world, access cards only prove that an individual has an access card or was able to make a copy of the access card. Despite their widespread implementation, such techniques represent a security hole in the modern world. Whether physical or digital, these constructs have been put in place to make access control decisions by confirming a person's identity at a given time. However, these systems create several security problems. First, while a password or a security card function as a proxy for a user's identity, neither validates that the person using the password (and/or card) is in fact the user to whom the identity belongs. Second, passwords or security cards can be easily compromised. For example, a user may guess another user's password or duplicate or steal another user's security card. Additionally, once access has been granted based on receipt of a password or security card, access is often granted for a longer period of time than is appropriate for an average user.

Although security techniques have been developed to address these problems, existing techniques are still unable to address the problems described above. Multi-Factor Authentication techniques may increase the difficulty required to impersonate another user, but they are still unable to validate a user's identity. Smart Cards may replace a username or password with a physical card and a PIN, but a user impersonating another user need only have their card and know their PIN to be granted access. Moreover, these techniques add additional implementation challenges, for example requiring users to carry additional security cards that are not practical for mobile users and requiring that physical access points be outfitted with compatible card reading technologies. Conventional biometric systems are very expensive and difficult to implement and are not designed to improve the convenience with which a user may be granted access. Moreover, these systems still often rely on a back-up password which can be stolen or guessed by another user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
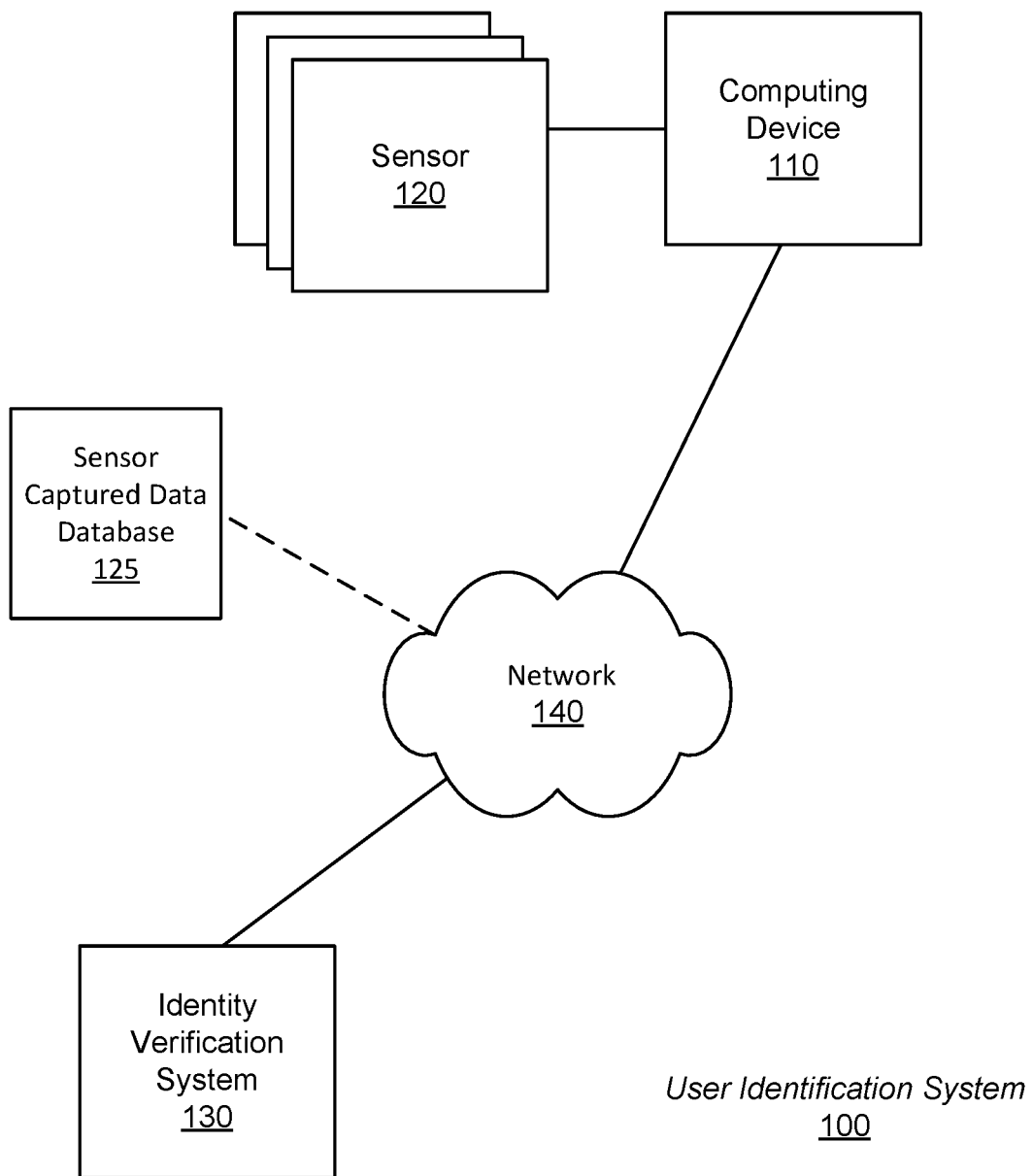
FIG. 1 illustrates one embodiment of an identification system for identifying a user based on sensor captured data which includes motion information characterizing the user, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Embodiments of a user identification system determine the identity of a user based on motion data received from a plurality of sources, for example using data collected by an accelerometer or gyroscope on a user's mobile device. The data may be collected using one or more of the following: cameras, motion sensors, GPS, WiFi (SSID/BSSID, signal strength, location, if provided), and multitude of other sensors capable of recording user data.

In addition to visual characteristics, individuals may be characterized with particular movements and motion habits. Accordingly, by identifying one or a combination of particular movements based on data captured by motion sensors the system may be able to identify a user from a population of users. As described herein, motion data describes not only a particular movement by a user, but also additional considerations, for example the speed at which the motion occurs or various habits or tendencies associated with the motion. In embodiments in which the system uses a combination of movements to identify a user, the verification system operates under the assumption that each user is associated with a unique combination of motion data. Accordingly, a unique combination of motion data may be interpreted as a user's unique signature or identifier. For example, although two users may swing their arms while walking and holding their phone, each user swings their arms at a different rate or cadence. To generate the unique combination of interest, the system may consider signals recorded from several sensors and/or a combination of several such signals. In some embodiments, the unique combination of motion data (or signature for a user) may be interpreted at a finer level of granularity than the above example.

As the user moves with their mobile device, motion sensors internally coupled to the device or communicatively coupled to the device (e.g., smartwatch or bracelet or pendant with sensors) record motion data. The system applies a combination of machine-learned models, or in some embodiments, a single model to analyze the recorded motion. Accordingly, the user identification system, as described herein may verify a true (or actual) identity of a particular user (or individual) rather than merely confirming that a user has certain access credentials. When the mobile device is in motion, sensor data describing the motion of the phone is communicated to a server where human identification inference is performed.

To that end, using machine-learning and statistical analysis techniques, the identity verification system may classify continuously, or alternatively periodically, recorded motion data into particular movements. For each movement, the verification system determines a user's identity and a confidence level in that identity. In implementations in which the identity is determined with a threshold level of confidence, the user is granted access to a particular operation. In some implementations, a user's identity may be determined based on information recorded from multiple sensors of sources. As described herein, a confidence level may include a probability level.

System Environment

FIG. 1 shows an identification system 100 for identifying a user based on sensor captured data which includes movement information characterizing the user, according to one embodiment. The identification system 100 may include a computing device 110, one or more sensors 120, an identity verification system 130, and a network 140. Although FIG. 1 illustrates only a single instance of most of the components of the identification system 100, in practice more than one of each component may be present, and additional or fewer components may be used.

A computing device 110, through which a user may interact, or other computer system (not shown), interacts with the identity verification system 130 via the network 140. The computing device 110 may be a computer system. An example physical implementation is described more completely below with respect to FIG. 12. The computing device 110 is configured to communicate with the sensor 120. The communication may be integrated, for example, one or more sensors within the computing device. The communication also may be wireless, for example, via a short-range communication protocol such as Bluetooth with a device having one or more sensors (e.g., a smartwatch, pedometer, bracelet with sensor(s)). The computing device 110 also may be configured to communicate with the identity verification system 130 via network 140.

With access to the network 140, the computing device 110 transmits motion data recorded by the sensor 120 to the identity verification system 130 for analysis and user identification. For the sake of simplicity, the computing device 110, is described herein as a mobile device (e.g., a cellular phone or smartphone). One of skill in the art would recognize that the computing device 110 may also include other types of computing devices, for example, a desktop computer, laptop computers, portable computers, personal digital assistants, tablet computer or any other device including computing functionality and data communication capabilities to execute one or more of the processing configurations described herein. An example of one or more components within a computing device 110 is described with FIG. 12.

The one or more sensor 120 may be configured to collect motion data (direct and indirect) describing the movements of a user operating the mobile device 110. As described herein, sensors 120 may refer to range of sensors or data sources, either individually or in combination, for collecting direct motion data (e.g., accelerometers, gyroscopes, GPS coordinates, etc.) or indirect motion data (e.g., Wi-Fi data, compass data, magnetometer data, pressure information/ barometer readings), or any other data recorded by a data source on or in proximity to the mobile device 110. In some embodiments, the computing device 110 is a desktop, but the computing device 110 may alternatively include, but is not limited to, a computer mouse, a trackpad, a keyboard, and a camera.

The identity verification system 130 may be configured as a verification system to analyze data to draw particular inferences. For example, the identity verification system 130 receives motion data and performs a series of analyses to generate an inference that correspond to an identify of a user associated with the motion data from a population of users. Generally, the identity verification system 130 is designed to handle a wide variety of data. The identity verification system 130 includes logical routines that perform a variety of functions including checking the validity of the incoming data, parsing and formatting the data if necessary, passing the processed data to a database server on the network 140 for storage, confirming that the database server has been updated, and identifying the user. The identity verification system 130 communicates, via the network 140, the results of the identification and the actions associated with it to the computing device 110 for presentation to a user via a visual interface.

The network 140 represents the various wired and wireless communication pathways between the computing device 110, the identity verification system 130, and the sensor captured data database 125, which may be connected with the computing device 110 or the identity verification system 130 via network 140. Network 140 uses standard Internet communications technologies and/or protocols. Thus, the network 140 can include links using technologies such as Ethernet, IEEE 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), a custom binary encoding etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above. In alternate embodiments, components of the identity verification system, which are further described with reference to FIGS. 2 and 5, and the sensor captured data database 125 may be stored on the computing device 110.

Identity Verification System

Figure 2:
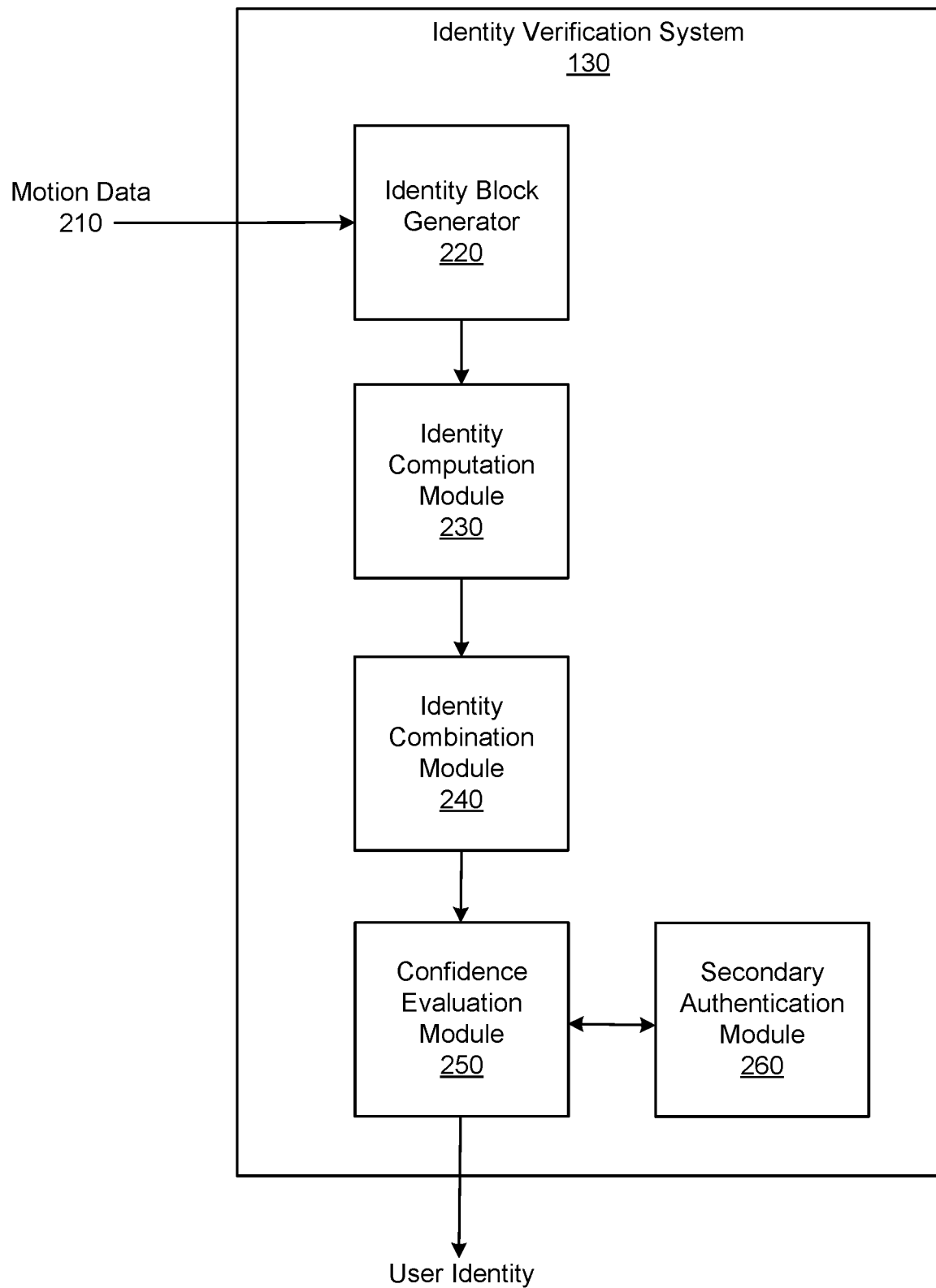
FIG. 2 is a block diagram of the system architecture of the identity verification system, according to one embodiment.

FIG. 2 is a block diagram of an example system architecture of the identity verification system 130, according to one embodiment. The identity verification system 130 may include an identity block generator 220, an identity computation module 230, an identity combination module 240, a confidence evaluation module 250, and a secondary authentication module 260. In some embodiments, the identity verification system 130 includes additional modules or components.

The identity block generator 220 receives motion data 210, or more broadly behavior data described a user's actions during a period of time, recorded from one or more different sources (e.g., motion data recorded directly by sensors configured with mobile devices, sensor data recorded indirectly from internet of Thing (IOT) sensors, and traditional enterprise system sources). As described herein, enterprise systems refer to an entity with infrastructure for keeping data secure (e.g., a security system of a physical building or digital server). Motion data 210 recorded by a sensor is associated with a particular user for whom the system verifies their identity. In implementations in which motion data 210 is recorded directly or indirectly by a multitude of sensors, each recording is communicated to be processed independently by the identity block generator 220.

The identity block generator 220 receives motion data 210 recorded by a sensor, for example a gyroscope or accelerometer embedded in a mobile device, as continuous signal, for example a signal sampled at a frequency of 100 Hz (resampled to 50 Hz). To improve processing capacity and accuracy, the identity block generator 220 divides the received signal into multiple segments of equal length. In one implementation, the identity block generator 220 generates segments 128 units in length. As described herein, the units that characterize the length of a segment refer to a unit describing the continuous nature of the recorded signal, for example time (e.g., seconds or milliseconds). Accordingly, each segment generated by the identity block generator 220 may be 2.56 seconds long. The length of each segment and the units from which the segment is determined may be tuned by a human operator or supervisor based on a set of specifications received from an enterprise system, optimized over time by a machine-learned model, or a combination of both.

In one example embodiment, a portion of the motion data 210 in a segment overlaps with a portion of motion data in the immediately preceding segment and a portion of motion data in the immediately succeeding segment. In an exemplary implementation in which the overlap between segments is tuned to 50%, motion data may be recorded from 0 to 256 samples. The identity block generator 220 generates a first segment including motion data recorded between 0 samples and 128 samples, a second segment including motion data recorded between 64 samples and 192 samples, and a third segment including motion data recorded between 128 samples and 256 samples. As will be further described below, the segmentation of motion data 210 allows the identity verification system 130 to distinguish transitions between movements or types of movements. For example, the system may segment motion data 210 into three portions: a user entering into a building with a quick stride, walking up the stairs, and then slowing to a standing still position in the room. Using the segmented motion data 210, the system is able to more accurately identify the user and to ensure a timely response to a user requesting access to an enterprise.

The identity block generator 220 converts each segment of motion data 210 into a feature vector representation that a machine-learned motion classification model is configured to receive. A feature vector comprises an array of feature values that represent characteristics of a user measured by the sensor data, for example a speed at which the user is moving or whether the user was moving their arms is encoded within the feature vector. In one implementation, the identity block generator 220 converts a segment of motion data into an n-dimensional point cloud representation of the segment using a combination of signal processing techniques, for example a combination of Fast Fourier transform (FFT) features, energy features, delayed coordinate embedding, and principle component analysis (PCA). The segmented motion may be stored as a vector, graph, and/or table with associated data corresponding to a value of the representation of the motion in that particular segment for the particular individual. The individual further may be associated with a unique identifier.

Based on the input feature vector, the machine-learned motion classification model outputs a particular movement, for example speed walking, leisurely walking, or twirling a phone. Alternatively, the machine learned model outputs a broader category of movements, for example walking which includes speed walking and leisurely walking. The motion classification module may apply one or more clustering algorithms before processing each cluster of points into an output. In some implementations, the motion classification module additionally performs topological data analysis (TDA) to improve the accuracy or quality of identifications determined by the identity verification system 130.

In one embodiment, training of the machine-learned motion classification model is supervised, but in another embodiment training of the model is unsupervised. Supervised motion classification training requires a large amount of labelled data and relies on manual feedback from a human operator to improve the accuracy of the model's outputs. In comparison, unsupervised motion classification enables fine-grained motion classifications, with minimal feedback from a human operator.

Because the motion classification model outputs a movement classification for each model, the identity block generator 220 interprets changes in a user's motion. In particular, between a segment labeled with a first movement and a segment labeled with a second movement, the identity block generator 220 identifies a motion discontinuity indicating the change in movements. As described above, a sequence of motion data may be divided into one or more segments with a certain level of overlap. Accordingly, in the example described above in which each segment shares a 50% overlap with both the immediately preceding segment and the immediately succeeding segment, the identity block generator 220 may only consider discontinuities between $25^{th}$ and $75^{th}$ percent of the segment. To enable the identity block generator 220 to identify discontinuities beyond the 25-75% range, the overlap between segments may be tuned manually based on a set of specifications received from an enterprise system, optimized over time by a machine-learned model, or a combination of both.

Between each of the identified discontinuities, the identity block generator 220 generates an identity block from the sequence of signals recorded between consecutive motion discontinuities. Because, in some implementations, consecutive segments are classified as the same movement, an identity block may be longer than the 128 units used to initially define a segment of motion data.

For each identity block, the identity computation module 230 generates one or more user identifications. Each identity block is broken into one or more signature sequences each one of which are converted into a confidence. Determining values representative of a user's identity on a per-sequence (at least one within an identity block) basis enables the identity verification system 130 to tailor their security assessment based on insights into a user's movements throughout a sequence of motion data. For example, during a first identity block, a first user's motion may be classified as walking and during a second identity block, a user's motion may be classified as running. To confirm that the classification in the second identity block still refers to the first user, and not to a second user who stole the first user's phone while the first user was walking and then ran away with it, the identity computation module 230 independently determines several identity values for each identity block. To account for such implementations in which a computing device may be carried or used by different users during different identity blocks, the identity computation module 230 may compute identity confidence values for an identity block independent of preceding or succeeding identity blocks. As described herein, the output of the identity computation module is referred to as a "identity confidence value" and corresponds to the identity value for a sequence within an identity block.

To that end, the identity computation module 230 implements machine learning techniques to determine an identity for a user over each sequence. As will be further discussed below, the module identifies a set of signature sequences within an identity block that are representative of the entire sequence of motion data included in the identity block. As described herein, the identity computation module 230 inputs a set of signature sequences from each set of motion data to an identity confidence model to process each set of motion data. The identity confidence model may include a probability consideration. The identity computation module 230 converts the identified signature sequences in a feature vector and inputs the converted feature vector into an identity confidence model. Based on the inputted feature vector, the identity confidence model outputs an identity confidence value describing the likelihood that motion in the identity block was recorded by a particular, target user. A target user may be specified to an enterprise system or operational context based on a communication of private key or signifier known only to the target user from a computing device 110 to the enterprise system.

In some example embodiments, the identity computation module 230 outputs a numerical value, ranging between 0 and 1, where values closer to 0 represent a lesser likelihood that the motion data was recorded by the target user compared to values closer to 1. Alternatively, the identity computation module 230 may determine confidence values using a logarithmic function in place of a raw numerical value (e.g., log(p) instead of p).

Because each identity block represents an independent event (e.g., a distinct action), the identity combination module 240 models a user's continuous activity, the identity or the confidence in the user's identity during that continuous activity, by combining the identity confidence value or decay of identity confidence values from each block into a continuous function. Additionally, data received from different sources, for example motion data, Wi-Fi information, GPS data, battery information, or keyboard/mouse data) during the same time period may be processed by different models into distinct identity confidence values for each type of data. In such implementations, the identity combination module 240 may combine the distinct identity confidence values generated by each model into a single, more comprehensive identity confidence value at a point in time. As described herein, such a comprehensive identity confidence value is referred to as an "aggregate identity confidence."

For data received from different sources for the same time period or a different time period, the identity block generator 220 generates a new set of identity blocks and the identity computation module 230 determines an identity confidence value for each of identity block of the new set. For example, if a set of motion data recorded over one hour is processed into three identity blocks, the identity computation module 230 determines an identity confidence value for each. If identity block generator 220 segments Wi-Fi data recorded during the same hour-long period into three additional identity blocks for which the identity computation module 230 determines three additional identity confidence values, the identity combination module 240 may combine the six distinct identity confidence values into a comprehensive identity confidence value for that period of time. The combination of identity confidence values by the identity confidence values by the identity combination module 240 is further described with reference to FIGS. 8-10. By combining identity confidence values into an aggregate identity confidence that represents a continuously decaying confidence for a period of time, the identity verification system 130 enables seamless and continuous authentication of a target user compared to conventional systems which merely authenticate a user at particular point in time.

The confidence evaluation module 250 compares an identity confidence value, for example an aggregate identity confidence determined by the identity combination module 240, to a threshold, for example an operational security threshold. Operational security thresholds may be generated by the identity computation module 230 and are further described with reference to FIG. 5. If the aggregate identity confidence is above the operational security threshold, the confidence evaluation module 250 confirms the user's identity and provides instructions for the target user to be granted access to the operational context. Alternatively, if the aggregate identity confidence is below the operational security threshold, the confidence evaluation module 250 does not confirm the user's identity and, instead, communicates a request to the secondary authentication module 260 for a secondary authentication mechanism. Upon receipt of the request, the secondary authentication module 260 implements a secondary authentication mechanism, for example a biometric test or a different on-demand machine-learned model to confirm the identity of a target user.

In alternate embodiments, prior to communicating an identity confidence value to the identity combination module 240 to combine the identity confidence value with one or more identity confidence values from other identity blocks, the identity computation module 230 communications a single identity confidence value determined for a particular identity block directly to the confidence evaluation module 250. If the confidence evaluation module 250 determines the identity confidence is above an operational security threshold, the confidence evaluation module 250 confirms the target user's identity and provides instructions for the target user to be granted access to the operational context. Alternatively, if the identity confidence value is below the operational security threshold, the confidence evaluation module 250 does not confirm the target user's identity and, instead, communicates a request to the secondary authentication module 260 to implement a secondary authentication mechanism.

As will be described with greater detail below, the identity computation module 230 may implement an exponential decay function to model a dynamic confidence measurement over the time interval included in an identity block. In such implementations, at an initial time, a confidence measurement in a user's identity may be high but as time passes in the identity block, the confidence measurement may decrease resulting in a change in value that follows an exponentially decaying trend.

To preserve processing capacity and run-time, the identity computation module 230 may regulate the rate at which data is collected from various sources to minimize the number of identity instances to be computed. The identity computation module 230 may adaptively modify the receipt of motion data or the collection of motion data based on a target user's location and current conditions relative to an operational context (e.g., a building, location, site, or area outfitted with an authentication security system). In some implementations, the identity computation module 230 may regulate data collection to a rate required to maintain an identity confidence value above a threshold confidence. When the identity confidence value is significantly above the threshold, the rate of data collection may be reduced, but as the identity confidence decreases, either as a decay function in an identity block or between identity blocks, the rate of data collection may increase at a proportional rate.

As another example, when a target user moves from one operational context to another (e.g., leaving a secure office), the identity computation module 230 may implement geofenced mechanisms that minimize data collection, for example since the system recognizes that the target user does not normally request authentication from the car. However, if the target user were to request access to the operational context from the car or a distance beyond the geo-fence, the enterprise system may implement a secondary authentication mechanism, for example a biometric authentication mechanism. Conversely, when a target user walks toward a locked door or logs into their computer in the morning, the identity computation module 230 increases data collection, and even collect this data over a cellular connection, to allow or deny access to the door with minimal user intervention and without secondary authentication.

In alternate embodiments (not shown) motion data 210 may be input directly to the identity computation module 230 rather than the identity block generator 220. In such embodiments, the identity computation module 230 encodes the motion data into a motion feature vector and uses a movement classification model to determine a movement classification for the feature vector. In such embodiments, the movement classification is input to an appropriate identity confidence model 510 to predict the identity of a target user. The appropriate identity confidence model 510 may be selected based on the source of the data or the type of behavioral data.

Generating Identity Blocks

Figure 3:
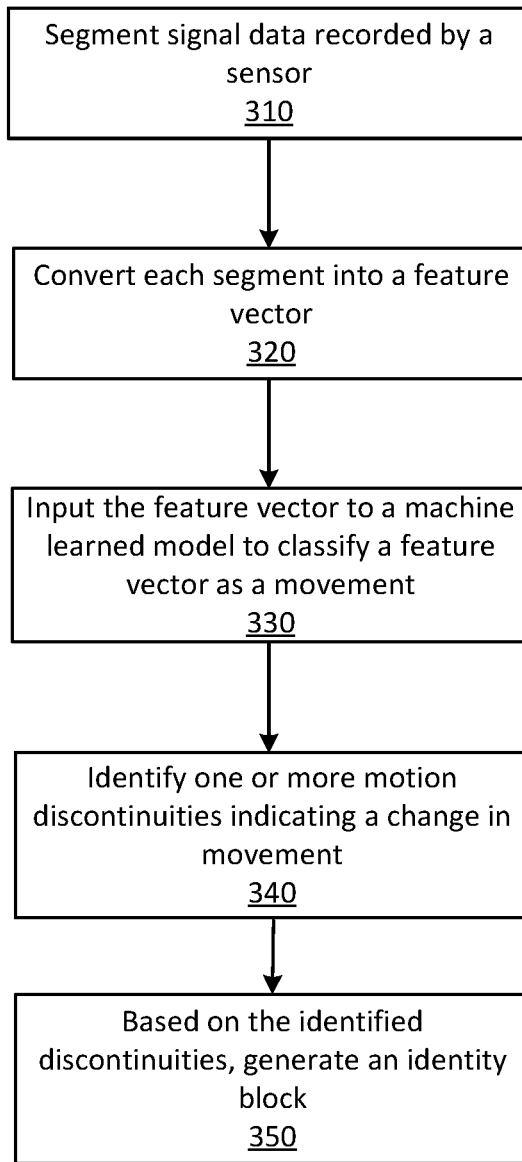
FIG. 3 illustrates a process for generating an identity block based on segments of motion data, according to one embodiment.

As described above, the identity verification system 130 processes sequences of motion data 210 into identity blocks that represent particular movements that a user has performed. FIG. 3 illustrates an example process for generating an identity block based on segments of motion data, according to one embodiment. The identity verification system 130 segments 310 motion data 210 recorded by one or more sensors. The length and delineation between segments may be tuned to enable to the system 130 to identify a user with improved accuracy. In most common embodiments, each segment is 128 units long with a 50% overlap with an immediately preceding and immediately succeeding segment.

The identity verification system 130 converts 320 each segment into a feature vector representing characteristics of the motion data within the segment. In some implementations, each feature vector is a point cloud representation of the sequence of motion data 210. The feature vector is input 330 to a machine learned model, for example a motion classification model) to classify the converted motion sequence as a particular movement or type of movement. Training of the motion classification model may be supervised, or alternatively unsupervised, based on the volume of available training data and the required complexity of the model. In implementations requiring a larger volume of training data, a more complex model, or both, the identity verification system 130 trains the motion classification model using unsupervised training techniques.

Using the motion classification model, the identity verification system 130 outputs a motion classification for each segment of an entire set of motion. Accordingly, the identity verification system 130 compares the motion classification of a particular segment against the classifications of adjacent or overlapping segments to identify 340 one or more motion discontinuities. As described above, a motion discontinuity indicates a change in motion classification between two segments, which may be further interpreted as a change in movement by a user in question. In such an embodiment, based on the identified discontinuities, the identity verification system 130 generates 350 one or more identity blocks between the identified discontinuities. In addition to those described above, the identity verification system may generate identity blocks using alternate methods.

Figure 4:
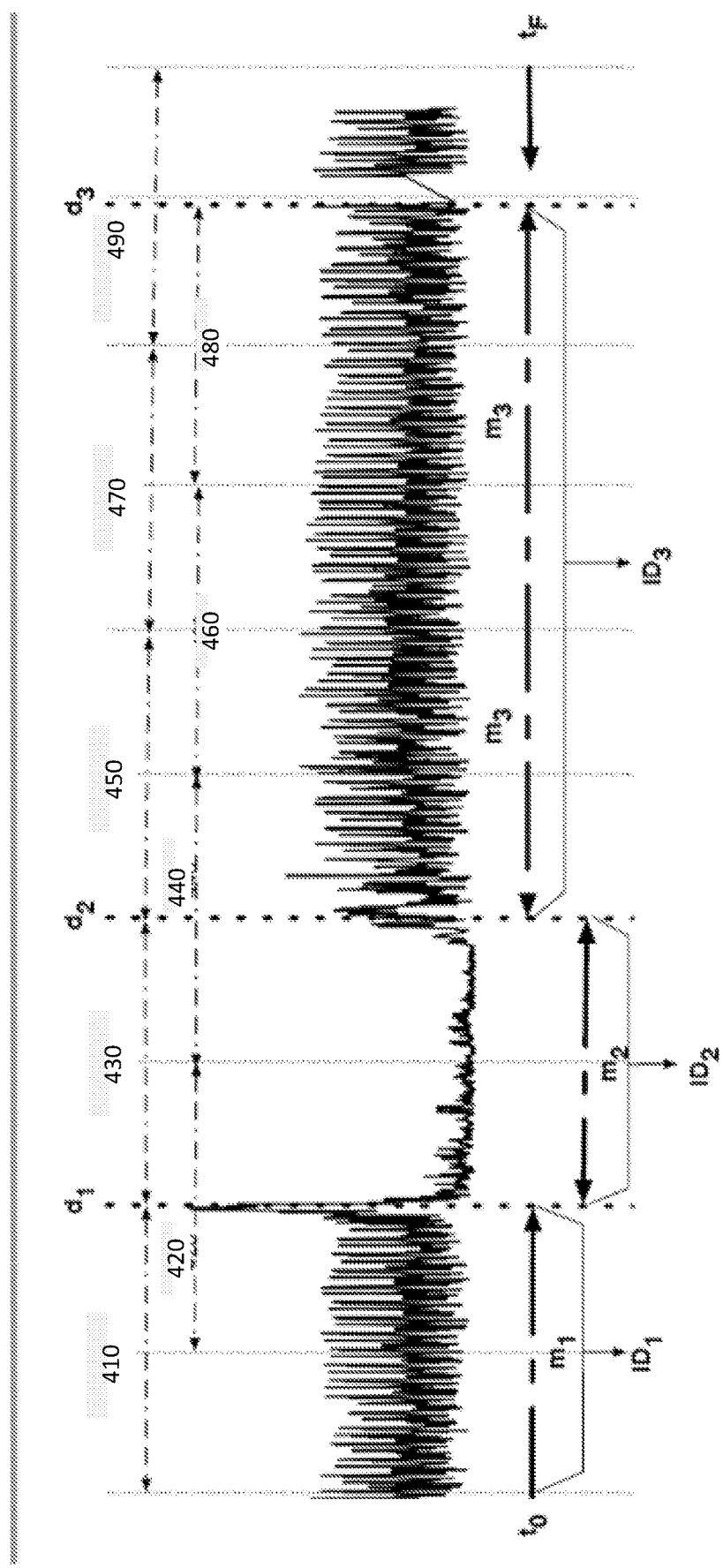
FIG. 4 illustrates an analysis for generating identity blocks from an example segment of motion data, according to one embodiment.

FIG. 4 illustrates an analysis for generating identity blocks from an example segment of motion data, according to one embodiment. The example illustrated in FIG. 4 includes a sequence of motion data recorded for a user between the times $t_0$ and $t_F$. The sequence is divided into nine overlapping segments of motion data: segment 410, segment 420, segment 430, segment 440, segment 450, segment 460, segment 470, segment 480, and segment 490. If each segment generated to be 128 samples long with a 50% overlap, segment 410 would range between 0 and 128 samples, segment 420 between 64 and 192 samples, segment 430 between 128 and 256 samples, segment 430 between 192 and 320 samples, and so on. The identity block generator 220 inputs each segment of motion data into the motion classifier model to output a motion classification for each segment. As illustrated in FIG. 4, segment 410 is classified as movement $m_1$, segment 430 is classified as movement $m_2$, segment 450, segment 460, segment 470, and segment 480 are classified as movement $m_3$, segments 420, 440, and 490 get classified as multiple movement types and are discarded. Because each classification of $m_1$ to $m_3$ represents a different movement or type of movement, therefore the identity block generator identifies motion discontinuities $d_1$, $d_2$, and $d_3$ at the transition between $m_1$ and $m_2$, $m_2$ and $m_3$, and at the end of $m_3$ respectively. Because segments 450, 460, 470, and 480 were classified as the same movement ($m_3$), the identity block generator 220 confirm that there is no motion discontinuity between these four segments.

Based on the initially defined segments and the identified motion discontinuities, the identity block generator 220 generates a first identity block $ID_1$ between $t_0$ and $d_1$, a second identity block $ID_2$ between $d_1$ and $d_2$, and a third identity block $ID_3$ between $d_2$ and $d_3$. Because the segments 450, 460, 470, and 480 were given the same motion classification, all four segments are included in identity block $ID_3$. Accordingly, identity block $ID_3$ represents a longer period as the other illustrated identity blocks. Returning to the example in which each initial segment is 128 samples long, identity block $ID_3$ represents a period of time two and half times as long period as a single segment, or 320 samples.

The identity block generator 220 correlates each identity block with the sequence of motion data that it contains and converts each identity block back into the segment of motion data. The converted segment of motion, represented as sequences of motion data signals, are communicated to the identity computation module 230. Returning to FIG. 4, identity block $ID_1$ is converted to segment 410, $ID_2$ is converted to segment 430, and $ID_3$ is converted to segments 450, 470, and 480. Accordingly, the converted segments are non-overlapping. However, in some embodiments, the end of an identity block includes an overlapping sequence to confirm that each sample of motion data in an identity block is considered in the computation of an identity confidence value.

In alternate embodiments, boundaries using to identify individual identity blocks may be triggered by external signals. For example, if a target user wears wearable sensor configured to continuously monitor the target user, removal of the wearable sensor may conclude an identity block and trigger the boundary of the identity block. As other examples, a computing device previously in motion that goes still, an operating software on a computing device that detects that a user has entered a vehicle, or a user crossing a geofenced boundary may similarly trigger the boundary of an identity block.

Computing User Identity

Using signature sequences from an identity block, the identity computation module 230 outputs a value—an identity confidence value—characterizing a confidence level that the motion recorded in the identity block refers to a particular target user. Returning to the example above in which a second user picks up a first user's phone from a table and runs away with it, the identity block generator 220 generates a first identity block during which the first user is walking with the phone, a second identity block during which the phone is resting on the table next to the first user, and a third identity lock during which the second user is running away with the phone. Assuming the first user as the target user, for the first and second identity block, the identity computation module 230 outputs values, indicating a high confidence that the motion refers to the first user. In comparison, the identity computation module 230 outputs a low confidence value for the third identity block indicating that the running motion data does not refer to the first user.

Figure 5:
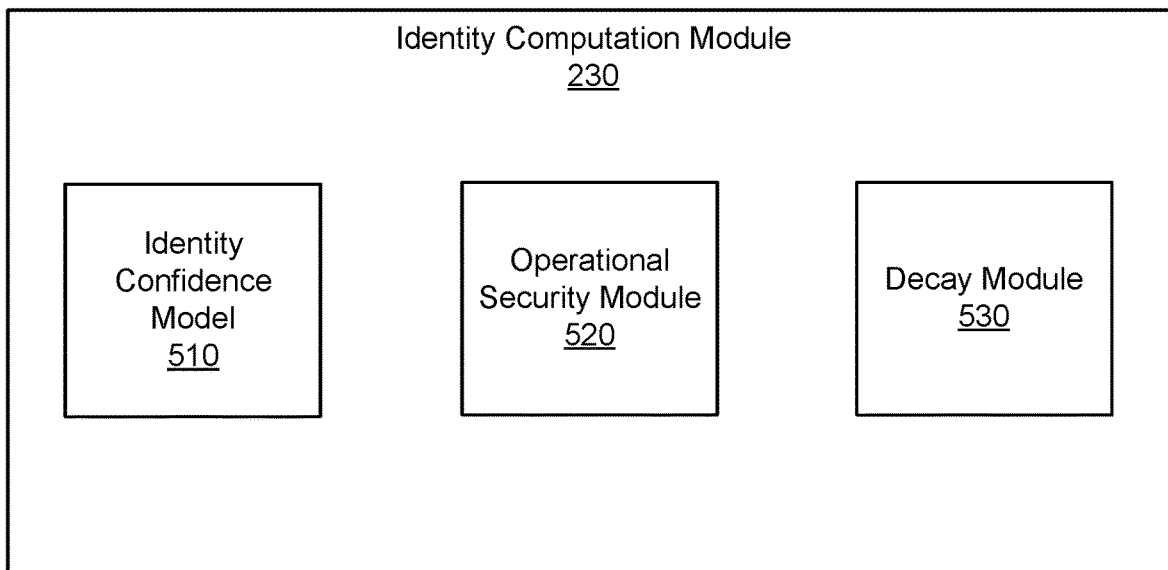
FIG. 5 is a block diagram of the system architecture of the identity computation module, according to one embodiment.

FIG. 5 is a block diagram of an example system architecture of the identity computation module 230, according to one embodiment. The identity computation module includes an identity confidence model 510, an operational security model 520, and a decay module 530. In some embodiments, the identity computation module 230 includes additional modules or components. In some embodiments, the functionality of components in the identity computation module 230 may be performed by the identity combination module 240. Similarly, in some embodiments, functionality of the identity combination module 240 may be performed by the identity computation module 230.

The identity confidence model 510 generates an identity confidence value within a range of values, for example between 0 and 1, which indicates a confidence that a set of motion data identifies a target user. As an identity confidence value increases towards one end of the range, for example towards 1, the confidence in the identity of the target user increases. Conversely, as an identity confidence value decreases towards an opposite end of the range, for example towards 0, the confidence in the identity of the target user decreases.

An operational context may be defined as a combination of an access requested by a user and the context of the user, for example the location of the user, the time-of-day, and the state of various models for a user. Given an operational context the operational security module 520 determines a security threshold against which the identity confidence value determined by the identity confidence model 510 is compared. As described herein, an operational context describes a situation, for example a location, site, or period of time, that includes a level of risk for granting access to a user given the conditions under which a user is attempting to gain access, the content to which a user is attempting to gain access, or a combination of the two. In an implementation in which an operational context is defined based on the conditions of access, the operational security module 520 may assign a bank vault a greater risk operational context than a safe in a hotel room. Alternatively, if a user attempts to access a bank vault after running to the vault (the running motion identified using the identity classification model), the bank vault may be dynamically associated with a greater risk operational context than if the user had walked up to the vault. In an implementation in which an operational context is defined based on content, the operational security module 520 may assign a greater risk operational context to a bank vault containing priceless pieces of art compared to an empty bank vault.

The operational security module 520 may determine an operational context based on conditions of an enterprise providing the operation. For example, if an enterprise is tasked with regulating access to a vault, the operational security module 520 may determine the operational context to be a vault. The module 520 may additionally consider the type of content or asset for which access is being given. For example, if a user is granted access to the digital medical files, the operational security module 520 may determine the operational context to be a hospital server. The operational security module 520 may additionally determine the operational context based on enterprise-specific location data. For example, the operational context for an access to an asset from a site located in Russia may be characterized differently than the access to the same asset from a site located in the United States. The granularity of location data used to characterize an operational context may vary from specific latitude and longitude coordinates to more general neighborhoods, cities, regions, or countries. Additionally, an operational context may vary based on the types of actions required for a user to enter a site. For example, the operational context for a site which may be entered by opening a single door may be assigned a higher level of risk than a site which may be entered by navigating through several hallways and by opening several doors.

In addition to the factors described above, the operational context may be determined based on any other combination of relevant factors. In some embodiments, the operational security module 520 may access vacation data, for example paid time off (PTO) records and requests, data stored on travel management sites, and enterprise employee data to evaluate whether a target user should be allowed access. For example, if vacation data and travel management data indicate that a target user is scheduled to be out of town, the operational security model 520 increases the security threshold for the target user since they are unlikely to be requesting access during that time. Similarly, based on employee data, if a target user was recently promoted and granted a higher security clearance, the operational security model 520 may decrease the security threshold for that target user. Alternatively, an operator affiliated with an enterprise system may specify an operational context or confirm the determination made by the operational security module 530.

Given an operational context, the operational security module 530 determines an operational security threshold. The operational security threshold is directly correlated with the level of confidence required for a particular action assigned to an operational context. In some embodiments, access to an operational context with a high operational security threshold is granted in situations where the identity computation module 230 generates an elevated identity confidence value. Accordingly, in such embodiments, access is granted to users for whom the identity computation is highly confident in their identity.

In some example embodiments, the operational security module 530 may implement a machine-learned security threshold model to determine an operational security threshold. In such implementations, the operational security module 530 encodes a set of conditions representative of a level of risk associated with the operational context, a level of security typically associated with the operational context, or a combination thereof as a feature vector. The feature vector is input the security threshold model to output an operational security threshold. Considerations encoded into such a feature vector may include, but are not limited to, a value of content to which access is being granted, a level of security clearance required for access to granted, a number of people with appropriate security clearance. The security threshold model may be trained using a training dataset comprised of operational security contexts characterized by a feature vector of such considerations and labeled with known security thresholds. Accordingly, based on the training dataset, the model is trained to optimally predict security thresholds when presented with novel operational contexts.

In some embodiments, the operational security threshold is directly related to conditions described above. For example, as the value of the content to which access is being granted increases and the level of security clearance increase, the operational security threshold increases and, resultingly, the minimum identity confidence value for access to be granted (e.g., the identity confidence value generated by the identity confidence model 510) increases. Alternatively, the operational security threshold is indirectly related to conditions described above. For example, as the number of people with appropriate security clearance decreases, the operational security threshold increases and, resultingly, the minimum confidence in a user's identity to be granted access also increases. Alternatively, an operator affiliated with an enterprise system may specify an operational security threshold or confirm the determination made by the security threshold model.

Given an operational context, the decay module 530 determines decay and risk parameters to model decay of an identity confidence value. In some embodiments, the decay module 550 estimates parameters using Bayesian estimation techniques where an enterprise administrator is trained to calibrate their probability estimation. In some embodiments, the risk associated with each operational context is estimated by the administrator and, in other embodiments, the risk is empirically measured based on data accessed from the enterprise or received from other companies in a similar field. The determined parameters processed by the confidence evaluation module 250 through a Dynamic Bayesian Network (DBN). In alternate embodiments, these parameters are estimated in a non-Bayesian framework in consultation with a stakeholder in the target enterprise.

Additionally, the decay module 530 may compute the decay and risk parameters based on a combination of location data for a corresponding operational context and location data for a target user attempting to gain access to the operational context. These parameters are processed by the confidence evaluation module 530 in a manner consistent with the Equations described below.

Based on the determined decay parameters, the decay module 530 dynamically adjusts the identity confidence value output by the identity confidence model 510 based on the location data recorded for a target user. The operational security module 520 may receive a record of anticipated locations at which an enterprise system expects a target user to request access and compare that to location data characterizing the target user's current location. In such implementations, location data may be recorded as GPS data on a computing device, for example, computing device 110. Such a computing device may be the same computing device recording a user's motion data or, alternatively, a different computing device. Alternatively, the operational security module 520 may compare the record of anticipated locations with location data assigned to the operational context. If neither the user's current location data nor the location data assigned to the operational context match any anticipated locations, the decay module 530 may accelerate the decay of the identity confidence value output by the identity confidence model 510.

Similar to the decay parameters, the decay module 530 may determine risk parameters based on current location data for a target user and a record of anticipated locations for the target user. For example, if location data for a target user indicates that they are in an unsecure, public location (e.g., a coffee shop or a restaurant), the decay module 530 may detect an increased level of risk and determine risk parameters that, when used to weight an identity confidence value, decrease the identity confidence value. Additionally, if a target user's current location data does not match with a record of their anticipated locations, the decay module 530 may detect an increased level of risk and determine risk parameters that decrease the identity confidence value. Alternatively, if a target user's location data or the conditions in an operational context indicate a reduced level of risk, the decay module 530 may determine risk parameters that reflect the lower level of risk and an increased confidence in identity confidence values determined by the identity confidence model 510.

Alternatively, as described below, the identity combination module 240 may reduce the identity confidence value weighted by the risk parameters. Such as an adjustment may be interpreted as an indication that a user could be requesting access to information or content that they should not have access to and, therefore, the confidence in that user's identity should be decreased. In alternate implementations, rather than dynamically adjusting an identity confidence value, the operational security module 520 adjusts the operational security threshold, for example by increasing the threshold if neither a user's current location data nor the location data assigned to the operational context match an anticipated location. The decayed identity confidence values are communicated to the confidence evaluation module 250, which determines whether or not to grant a target user access to an operational security context.

Figure 6:
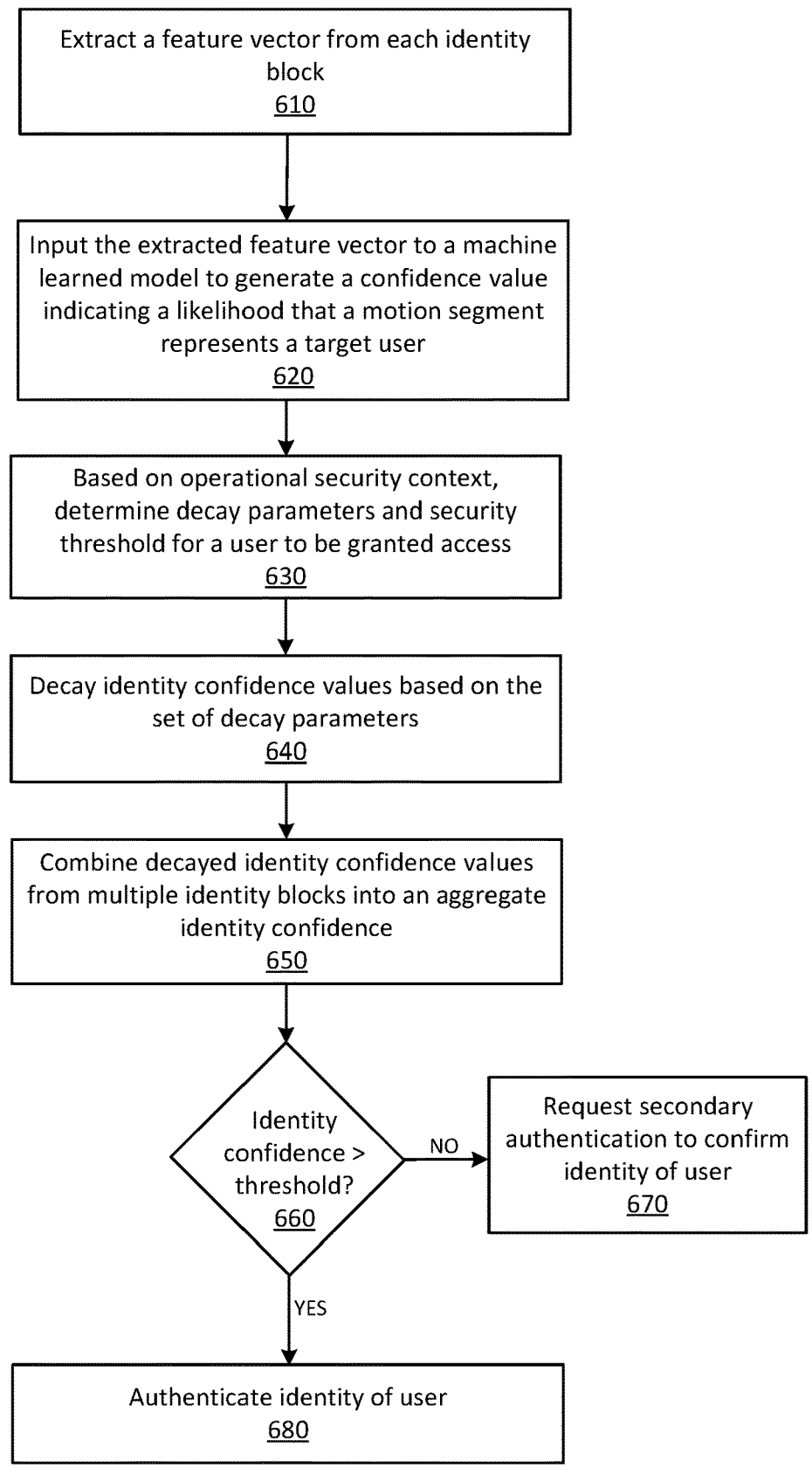
FIG. 6 illustrates a process for authenticating the identity of a user for an identity block, according to one embodiment.

FIG. 6 illustrates an example process for authenticating the identity of a user for an identity block, according to one embodiment. From each identity block, the identity computation module 230 identifies a set of signature sequences in each identity blocks and extracts 610 a feature vector from the signature sequences. The extracted feature vector is representative of characteristics of the motion data included in the identity block. The identity computation module 220 inputs 620 the extracted feature vector to a machine learned model to generate an identity confidence value indicating a likelihood that a segment of motion data represents a target user.

Based on an operational security context for which a user requests access, the identity verification system 130 determines 630, the system determines decay parameters and an operational security threshold for a user to be granted access. The identity verification system decays 640 the identity confidence value to the current time, or alternatively the time for which a target user's identity should be verified, by leveraging the determined decay parameters. As described above, the identity confidence value is determined for an individual identity block. However, the identity verification system 130 receives data from multiple data sources over a range of times which result in the generation of several identity blocks. Accordingly, the identity verification system 130 combines 650 decayed identity confidence values from multiple identity blocks into an aggregate identity confidence. The aggregate identity confidence is compared 660 to the security threshold. If the aggregate identity confidence is below the operational security threshold, the identity verification system 130 requests 670 a secondary authentication to confirm the identity of the target user. If the identity confidence value is above the threshold, the identity verification system 130 authenticates 680 the identity of the target user.

Figure 8:
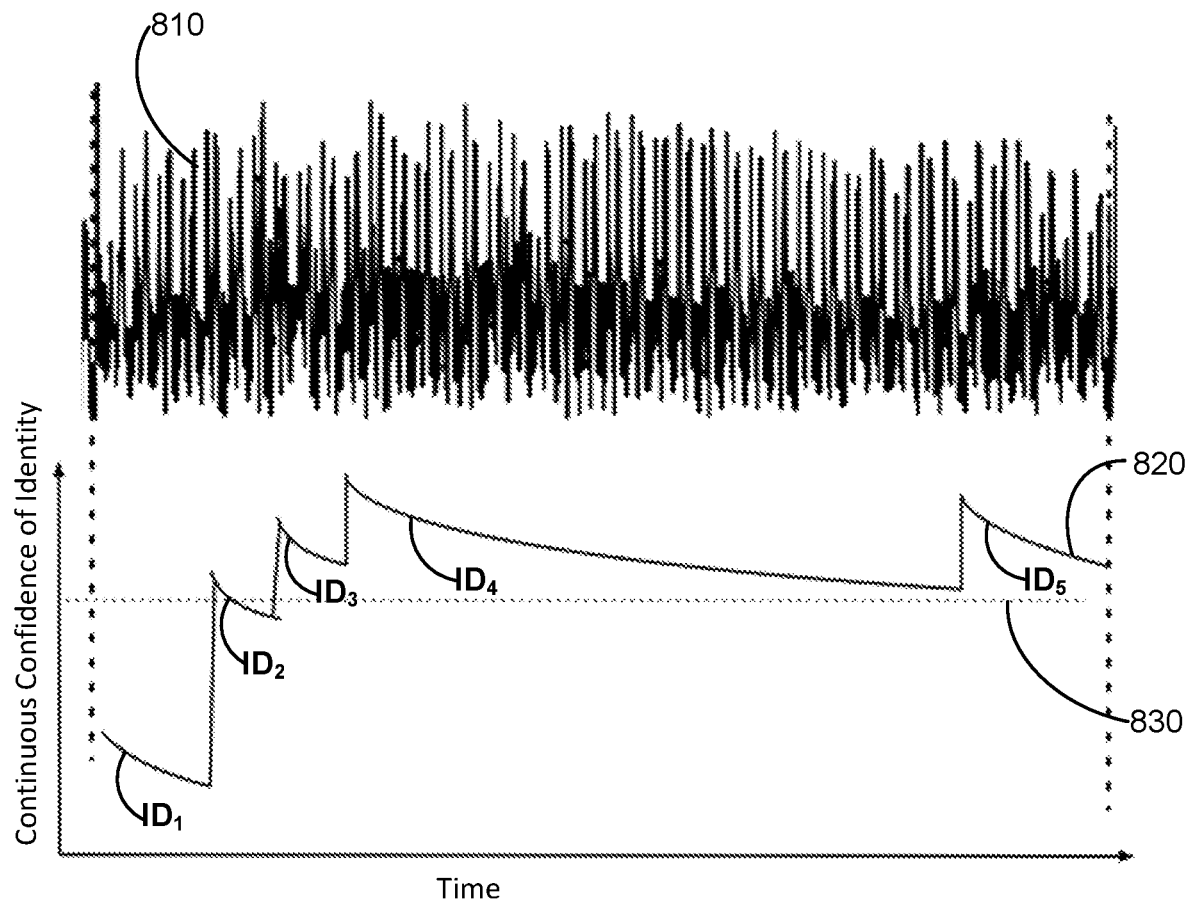
FIG. 8 illustrates an exemplary analysis for combining identity confidence values from multiple identity blocks, according to one embodiment.
Figure 9:
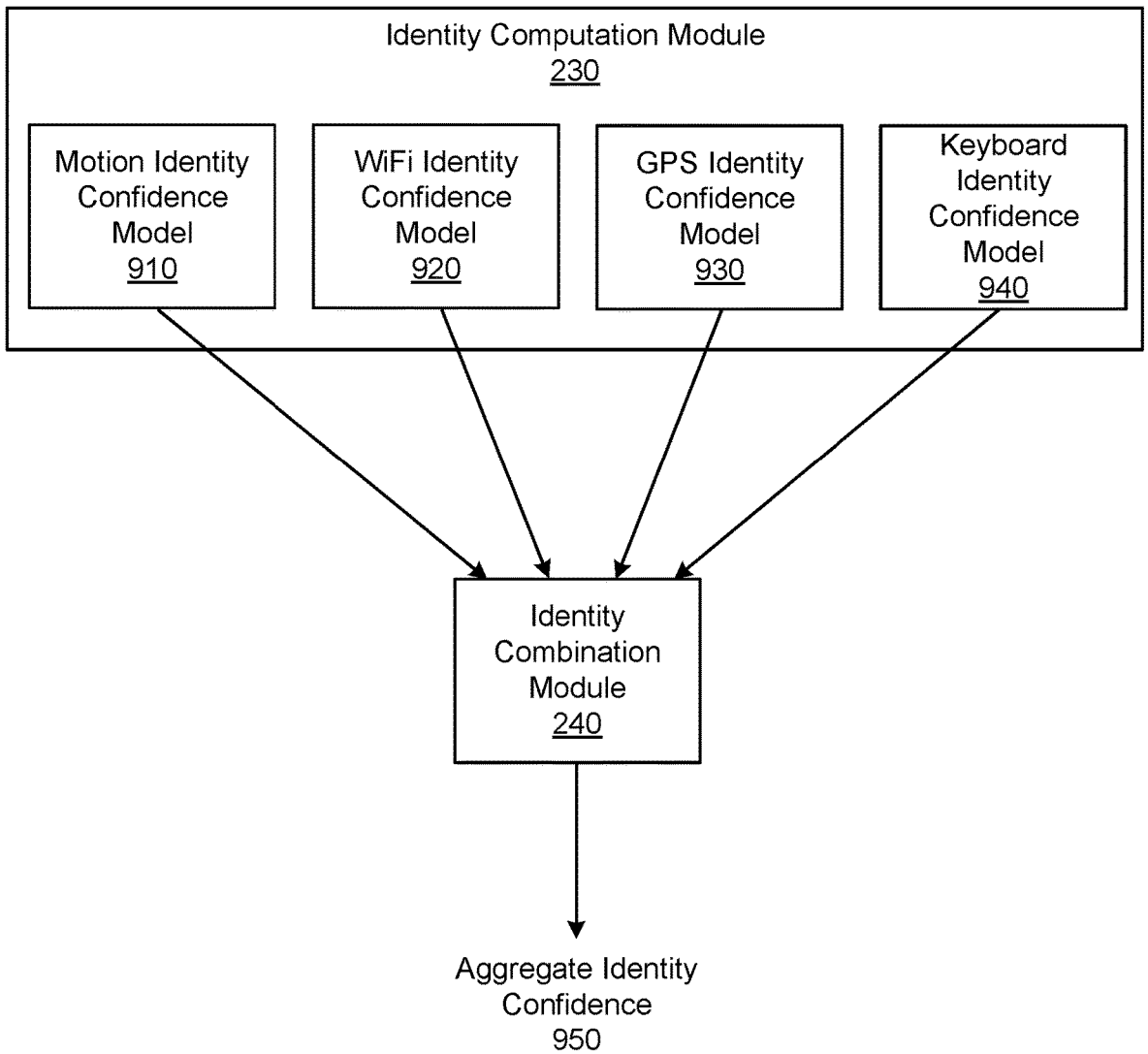
FIG. 9 illustrates a process for combining the results of outputs of a plurality of identification models to authenticate a user's identity, according to one embodiment.

In some embodiments described with reference to FIGS. 8-10, the identity verification system 130 combines identity confidence values received for the same and for different identity blocks received from various data sources into an aggregate identity confidence. The operational security module 520 determines a set of risk parameters for the operational context and adjusts the combined identity risk value based on the risk parameters. The aggregate identity confidence is then compared to the operational security threshold to evaluate whether to grant access to a target user.

Modeling Identity Confidence Value Decay

Effective security management systems recognize that while access may be granted to a user at a particular point in time, the user may maintain that security access for an extended period of time. For example, responsive to entering a correct password, a user may retain access to an account for longer than is necessary. As another example, responsive to approving a security card, a user may remain in a locked room for longer than is necessary. Accordingly, the identity verification system continuously receives sensor captured data and updates a security access for a user based on that captured data. Additionally, when computing identity probabilities for a user, the decay module 510 simulates a decaying confidence value, for example, as an exponential decay curve that may be a function of time and/or action expectation given an operational security context. In particular, the decay module 550 implements a decay function to model an identity of a user throughout time rather than a particular point in time. Returning to the example in which a user remains in a locked room for longer than necessary, the identity confidence model 510 may compute an identity confidence value which decays exponentially the longer the user remains in the room. If the user remains in the room for over a period of time, the confidence value computed by the identity confidence model may decay below a threshold value and the user's access is revoked, a notification is sent to security to remove the user from the room, or a combination of both.

Figure 7:
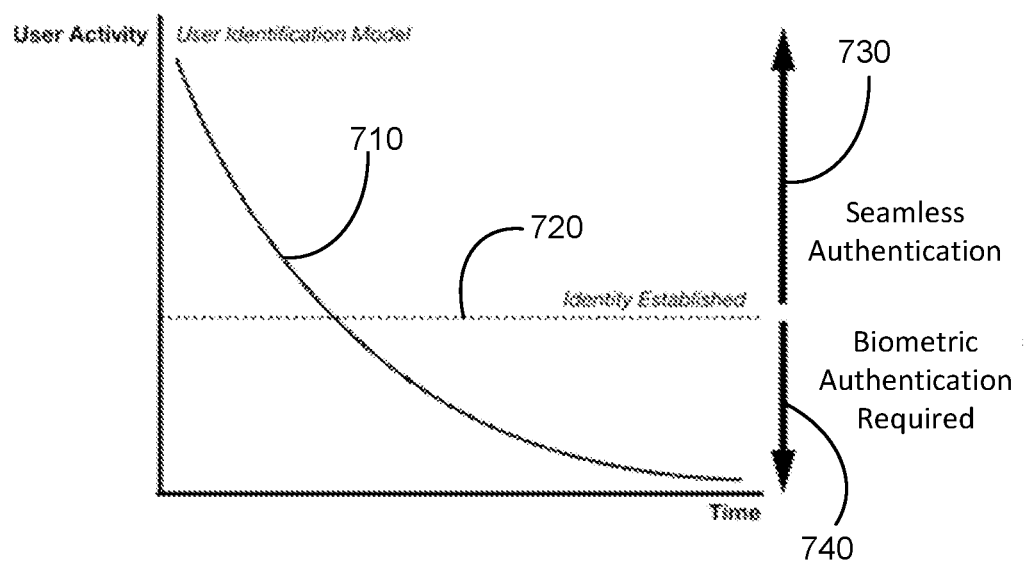
FIG. 7 illustrates an exemplary analysis for evaluating a user's identity at a threshold confidence using a decay function, according to one embodiment.

FIG. 7 illustrates an exemplary analysis for evaluating a user's identity at a threshold confidence using a decay function, according to one embodiment. In the illustrated embodiment, identity confidence values for a target user decays over time as an exponential decay function 710. At an initial time (e.g., the start of an identity block), the identity confidence value is a numerical value well above an operational security threshold 720. At such a time and at subsequent times at which the confidence value is above the threshold 730, the target user is granted access with seamless authentication 730. As described herein seamless authentication refers to authentication which verifies a user's identity without implementing a secondary authentication mechanism (e.g., a biometric scan). As time passes, the identity confidence value decreases at an exponential rate, eventually decreasing below the threshold 720. At the time at which the confidence value drops below the threshold 720 and for all subsequent times at which the confidence value remains below the threshold 720, the identity verification system relies on a secondary authentication mechanism, for example biometric authentication 840, to confirm the target user's identity.

In one example embodiment, to model an identity confidence value as a function of time, the decay module 550 determines an identity decay within individual identity blocks. To do so, the decay module 550 lowers an identity confidence value (p) using a combination of monotonic functions parameterized by a time constant ($\lambda$). Depending on the operational context, an identity confidence value with a more rapid decay may provide for more secure conditions. For example, if a target user is in a vulnerable or unsafe location, the operational context may be assigned a large $\lambda$-value resulting in a faster decay in identity confidence value compared to a safe or secure location that is assigned a smaller $\lambda$-value.

In this example decay may be modeled using Equation (1) produced below to compute an identity confidence value ($p_2$) of a target user at a time $t_2$ given the identity confidence value determined at an earlier time $t_1$ included in the same identity block.

$$p_{2t_2} = p_{2t_1} e^{-\lambda(t_2 - t_1)} \qquad (1)$$

In Equation (1), $\lambda$ is a time constant defined depending on an operational context. In an alternate embodiment, the decay may be a fixed ratio for each time step of a period of time resulting in an exponential decay. In yet another embodiment, the decay may be a fixed value at each time step resulting in a linear decay. In the example described above, the identity confidence value at a final time $t_f$ decays to 0, however in other embodiments, the identity confidence value may decay to another constant value (e.g., 0.5).

In a second example embodiment, the decay module 550 determines identity decay between identity blocks. In this example, depending on the actions to be performed by a target user and the conditions under which such actions are performed, for example the time of day and the location, the decay is modeled using a time constant ($\lambda_1$) and a strength constant ($\xi$). Consistent with the description from the first implementation, operational contexts associated with high levels of risk may be assigned higher time constants and lower strength constants than operational contexts with low levels of risk, resulting in a more rapid decay of the identity confidence value. As described above, depending on the operational context, an identity confidence value may preferably decay at a rapid rate. In operational contexts associated with a higher level of risk, the strength constant $\xi$ may be decreased, or set equal to 0, resulting in an instantaneous decay of the identity confidence value.

In this example embodiment decay may be modeled using Equation (2) produced below to compute an identity confidence value ($p_3$) for an identity block based on the identity confidence value ($p_2$) determined for an immediately preceding identity block.

$$p_{2t_2} = p_{2t_1} \xi e^{-\lambda_1(t_2 - t_1)} \quad (2)$$

In Equation (2), $\lambda_1$ is a time constant and $\xi$ is a strength constant, both of which are defined depending on an operational context. $t_1$ is a time at the conclusion of the preceding identity block, $t_2$ is a current time or a time at which a target user's identity is verified in a current identity block for which authentication is being computed, and $p_{2t_1}$ is a decayed confidence identity value computed at the conclusion of the preceding identity block.

Combining Identity Confidence Values

As described above with reference to FIG. 2, the identity combination module 240 combines identity confidence values from various signature sequences in various identity blocks into a continuous time sequence to provide a holistic representation of a target user's activity and the confidence associated with each set of motion data included in those activities. FIG. 8 illustrates an exemplary analysis for combining identity confidence values from multiple signature sequences within a single identity block, according to one embodiment. For a sequence of motion data 810, the identity block generator 220 divides a single identity blocks into signature sequences—$ID_1$, $ID_2$, $ID_3$, $ID_4$, and $ID_5$. For each signature sequence, the identity computation module 230 generates a unique confidence which is converted into a curve of decaying identity confidence values by the decay module 570 and combined with the combination module 580 resulting in a single identity confidence value curve 820. Additionally, for the identity block, the identity computation module 230 computes an operational security threshold based 830 on an operational context relevant to the identity block. Taken individually, each identity block represents a dynamically changing confidence that a target user is themselves.

However, taken in combination, they represent a dynamically changing confidence that a target user engaged in a continuous sequence of activities over an extended period of time. Accordingly, the identity combination module 240 aggregates the decaying identity values into a continuous identity confidence curve 820. As is illustrated, the identity confidence curve for each signature sequence is connected to an identity confidence curve for an immediately consecutive signature sequence by a vertical line. Additionally, given that the operational context for which a target user's identity is being evaluated does not change over the sequence of motion data, the operational security threshold 830 computed by the operational security module 530 remains constant. In alternate embodiments, the operational security threshold may change as the target user becomes involved in a different operational security context. In such embodiments, the identity combination module 240 may separate the motion sequence into a first set relevant to the first operational context and a second set relevant to the second operational context and compare each set against a respective operational security threshold.

In the illustrated embodiment of FIG. 8, the identity combination curve for sequence $ID_1$ was well below the threshold 830, however the identity combination curve for sequence $ID_2$ begins above the threshold before decaying below the threshold. Accordingly, between sequence $ID_1$ and sequence $ID_2$, the computed confidence in a target user's identity increased. Similarly, the computed confidence in the target user's identity continued to increase between $ID_2$ and $ID_3$ and between $ID_3$ and $ID_4$. Although the continuous curve 820 indicates a slight decrease in confidence between $ID_4$ and $ID_5$, the curve 820 indicates that the confidence in the target user's identity in sequence $ID_5$ did not fall below the threshold 830. Accordingly, the identity combination module 240 determines, based on the illustrated curve 820, that access to the operational context is not granted to the target user without secondary authentication during any time between the start time and end time of $ID_1$. Additionally, the identity combination module 240 determines that at the start time of $ID_2$, access to the operational context is granted to the target user, however during $ID_2$, secondary authentication will be necessary to maintain access. The identity combination module 240 further determines that from the start time of $ID_3$ to the end time of $ID_5$, access to the operational context is continuously granted to the target user without additional confirmation from a secondary authentication mechanism.

In some example embodiments, the identity computation module 230 may implement a different source-specific identity confidence model to process motion data (or another type of data, e.g. keyboard data) depending on the source from which that motion data was recorded. For a given identity block (and signature sequence), each model outputs an independent identity confidence value, so the identity combination module 240 aggregates each identity confidence value into an aggregate identity confidence. FIG. 9 illustrates a process for combining the results of outputs of a plurality of identification models to authenticate a user's identity, according to one embodiment. In the illustrated embodiment, the identity computation module 230 includes multiple source-specific confidence models compared to the embodiment illustrated in FIG. 5 that includes a single confidence model. In particular, the identity computation module 230 includes a motion identity confidence model 910 for processing motion data (e.g., recorded by accelerometers or gyroscopes), a WiFi identity confidence model 920 for processing data recorded via WiFi signals, a GPS identity confidence model 930 for processing data recorded via GPS signals, a keyboard confidence model 940 for processing data related to a how a user types on a computing device. In addition to those described above, the identity computation module may include additional identity confidence models to process additional types of information not disclosed herein.

The identity combination module 240 combines the identity confidence generated by each model (e.g., each of the model 910, 920, 930, and 940) into an aggregate identity confidence 950. In some example embodiments, an aggregate identity confidence for identity confidence values generated by a first model (e.g., a motion identity probability model 910) and a second model (e.g., a GPS identity confidence model 930) may be computed according to Equation (3):

$$p_{3t_2} = 1 - (1 - \alpha p_{1t_2})(1 - \beta p_{2t_2}) \quad (3)$$

where $p_1$ and $p_2$ are existing identity confidence values output by a first model ($m_1$) and a second model ($m_2$) respectively. Both $p_1$ and $p_2$ have decayed to time $t_2$. $p_{32}$ represents the aggregate identity confidence and both a and are risk parameters used to weight $p_1$ and $p_2$, respectively.

In alternate embodiments, the identity combination module 240 may leverage a Bayesian framework in which a target user is defined as a source node and the outputs of each identity confidence model are defined as target nodes with values $p_1$ and $p_2$. The aggregate identity confidence may be calculated using various Bayesian inference techniques including, but not limited to, Markov chain Monte Carlo (MCMC), Bayesian inference using Gibbs Sampling (BUGS), and loopy belief propagation.

As described above, if an identity confidence value is below a threshold, the identity computation module 230 implements a secondary authentication mechanism, for example a biometric test to verify the user's identity. In such embodiments, the secondary authentication mechanism generates a secondary identity confidence value that is combined by the identity combination module 240 with the identity confidence value generated by an identity confidence model. Accordingly, the identity combination module 240 implements Equation (3) to combine the secondary identity confidence value and the identity confidence value into an aggregate identity confidence value. In such implementations, $p_2$ is replaced with $p_\gamma$, which represents the decayed secondary identity confidence value generated by the secondary authentication mechanism and $t_2$ represents the time at which the access to the asset was requested. Decay in secondary confidence values generated by secondary authentication mechanisms is generated using the techniques described above with reference to FIG. 7.

In some embodiments, despite the combination of identity confidence values from multiple sources, the aggregate identity confidence may still be below an operational security threshold. Accordingly, the identity computation module 230 requests secondary authentication and, in response to receiving a secondary identity confidence value, the identity combination module 240 executes a second round of processing to combine the secondary identity confidence value with the aggregate identity confidence to generate an updated aggregate identity confidence. If the updated aggregate identity confidence value is greater than an operational security threshold, access is granted. If the updated aggregate identity confidence value is less than the operational security threshold, access is denied.

In an exemplary implementation involving a combination of probability models, an identity verification system identifies a target user requesting access to an operational context. The target user engages in a plurality of activities or action types which are recorded by a plurality of data sources, for the example the data source described with reference to FIG. 8. Data recorded by each of the data sources, for example keyboard data, motion data, Wi-Fi data, are received by the identity computation module 230. The identity computation module 230 employs several probability models, each of which is configured to receive a particular type of data or data describing a particular type of activity. The identity computation module 230 inputs each type of data into a respective probability model, each of which generates an identity confidence value. A set of decay parameters, for example those determined by the decay module 550, are applied to each identity confidence value resulting in an exponentially decaying identity confidence value representing a period of time from which the initial data was recorded. As described with reference to FIG. 5, because the set of decay parameters are determined based on the operational context, the same set of decay parameters may be applied to each identity confidence value.

To capture a complete evaluation of the target user's identity, the identity combination module 240 aggregates each decayed identity confidence value into an aggregate identity confidence. In some embodiments, the level of risk associated with granting access to an operational context is modeled using a set of risk parameters. The risk parameters may be used to scale an aggregate identity confidence to reflect the level of risk. Accordingly, the aggregate identity confidence may be adjusted based on the risk parameters. Once updated, the aggregate identity confidence is compared to the operational security threshold. If the aggregate identity confidence is greater than the threshold, the target user is granted access. If the aggregate identity confidence is below the threshold, the identity computation module 230 request a secondary authentication mechanism evaluate the user's identity.

Figure 10:
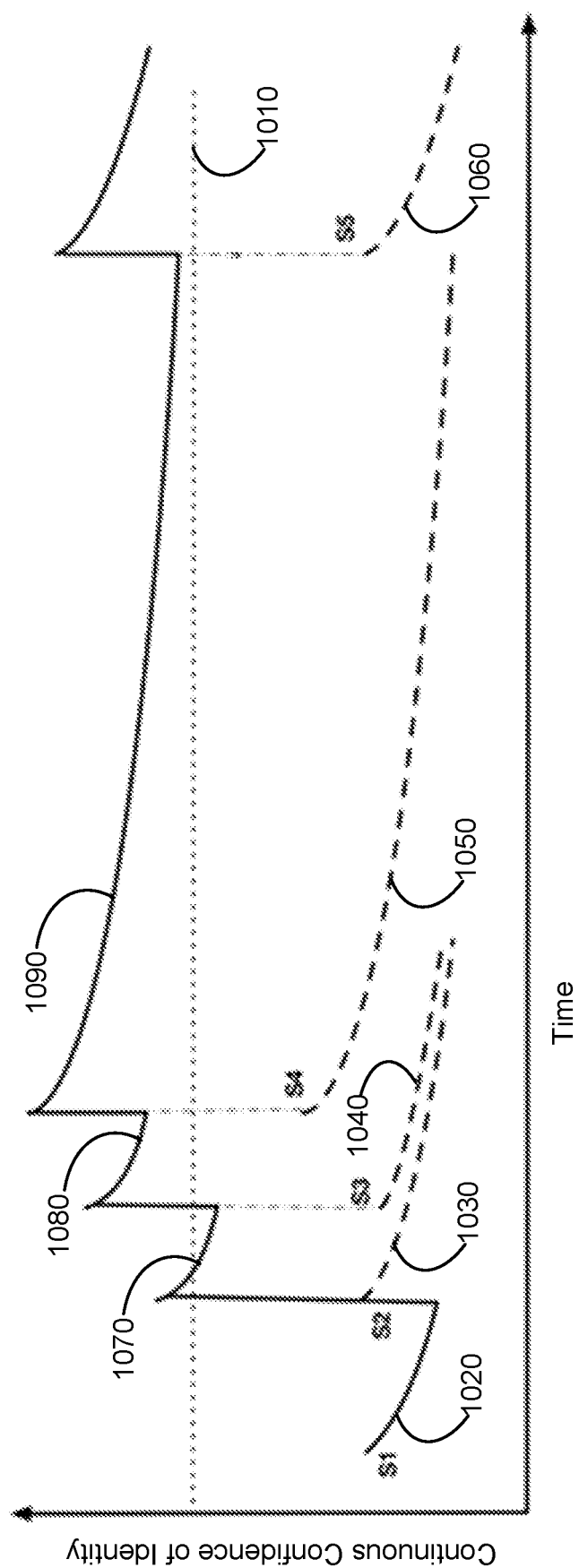
FIG. 10 illustrates an exemplary analysis for evaluating an aggregate identity confidence at a threshold confidence, according to one embodiment.

FIG. 10 illustrates an exemplary analysis for evaluating an aggregate identity confidence at a threshold confidence, according to one embodiment. In the illustrated analysis, multiple decaying identity confidence values 1020, 1030, 1040, 1050, and 1060 each of which is generated by a different, independent identity confidence model (e.g., S1, S2, S3, S4, and S5, respectively). When processed alone against an operational security threshold 1010, each of the decaying identity confidence values fails to satisfy the threshold. However, when identity confidence values 1020 and 1030 are combined by the identity combination module 240 into an aggregated identity confidence 1070, the aggregated identity confidence 1070 initially satisfies the threshold 1010, before decaying below the threshold. When the aggregated identity confidence value 1070 is updated by the additional combination of identity confidence values 1040, the updated identity confidence value 1080 remains above the threshold for the entirety of the identity block. Accordingly, while the identity confidence values generated by each model may independently be insufficient to grant a target user access to an operational context, the combination of identity confidence values 1020, 1030, and 1040 into aggregate identity confidence 1080 confirms the target user's identity with enough confidence to grant the user access to the operational context for the entire duration of 1080.

In addition to the techniques described above, the identity combination module 240 may combine identity confidence values or decaying identity confidence values which represent different conclusions about a target user's identity to determine an aggregate identity confidence for the target user. Based on data recorded for a single identity block, the identity computation module 230 may generate two identity confidence values or decaying identity values: an identity confidence curve, for example the curve illustrated in FIG.

10, indicating a likelihood that the motion data represents the target user and a rejection risk curve that the motion data does not represent the target user. Alternatively, the rejection risk curve may indicate that the motion data represents behavior inconsistent with the target user and, therefore, assign a level of risk to the motion data. To generate the identity confidence curve, the identity computation module 230 & combination module 240 may implement a machine-learned confidence model, but implement a different machine-learned rejection model to generate the rejection risk curve.

Additionally, each confidence curve may be generated using different sets of data recorded from different sources. For example, an identity confidence curve indicating a likelihood that a target user is Jeff is generated based on motion data received from a mobile device and processed by a motion data model, whereas a rejection risk curve indicating a likelihood that a target user is not Jeff is generated based on Wi-Fi data processed by a Wi-Fi model.

Figure 11A:
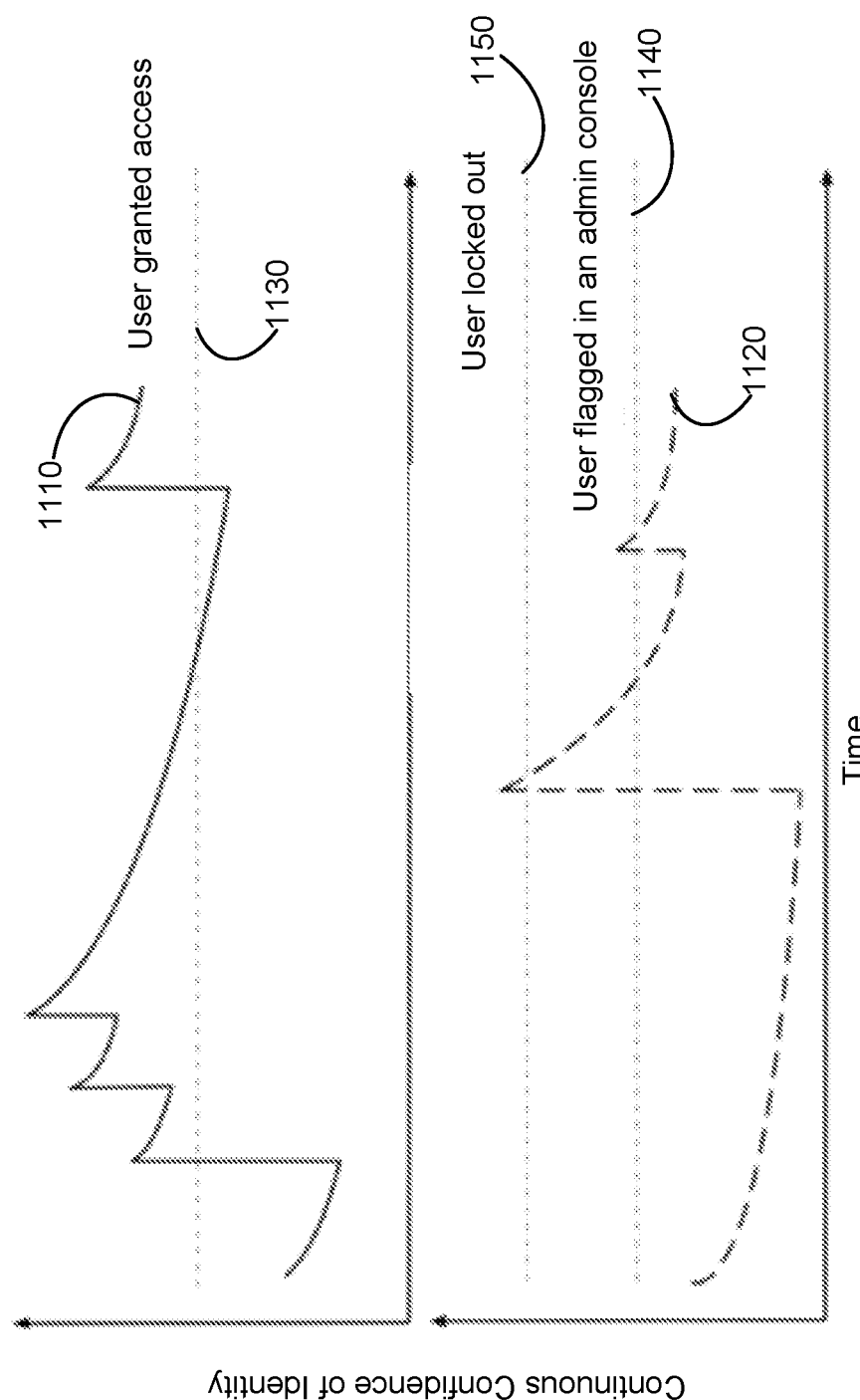
FIGS. 11A and 11B illustrate example implementations in which a confirmation confidence curve and a rejection risk curve may be processed simultaneously to verify a target user's identity, according to one embodiment
Figure 11B:
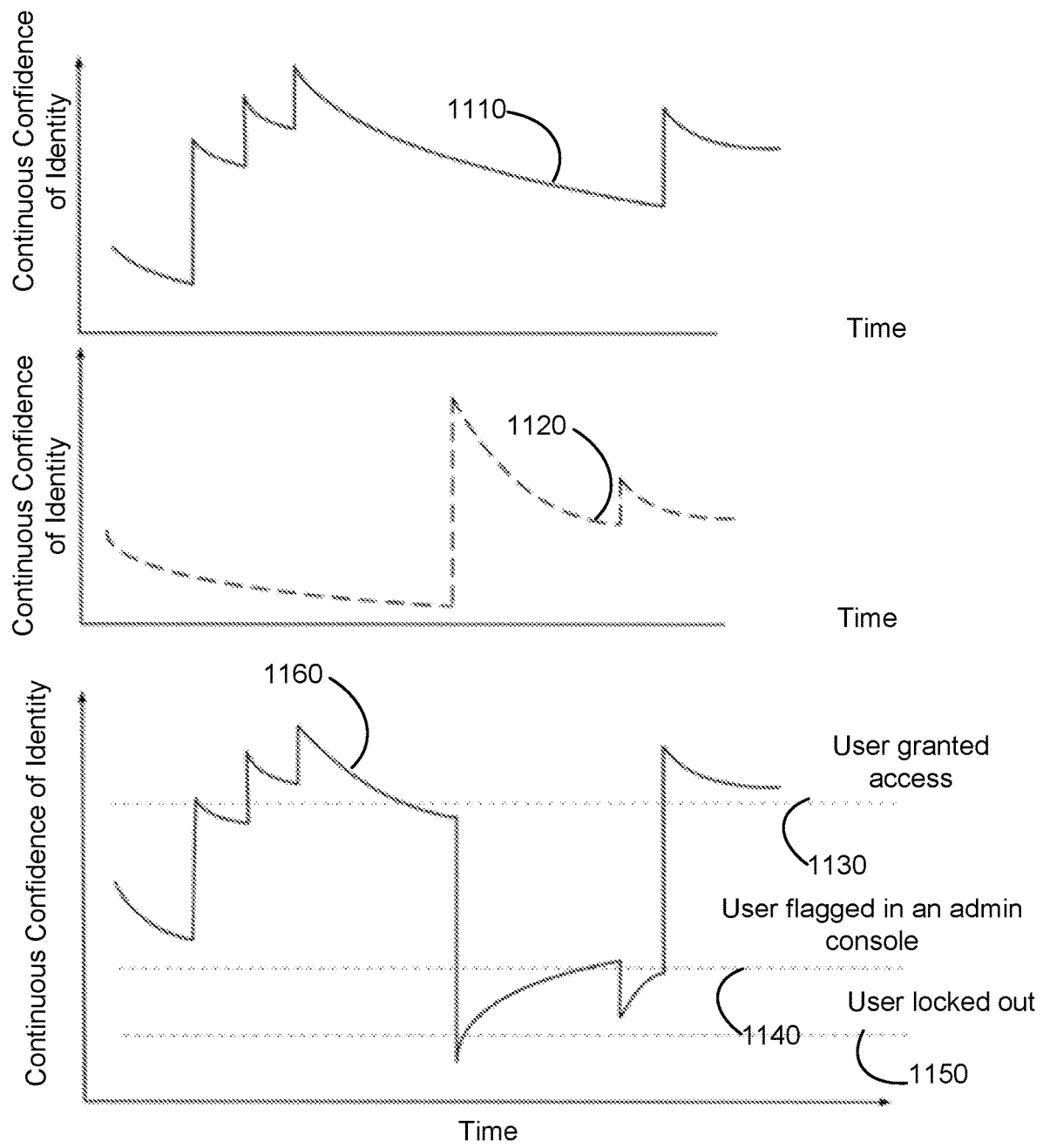

FIGS. 11A and 11B illustrate example implementations in which a confirmation confidence curve and a rejection risk curve may be processed simultaneously to verify a target user's identity, according to one embodiment. In a first implementation illustrated in FIG. 11A, the identity verification system 130 processes a confirmation confidence curve 1110 and a rejection risk curve 1120 separately. An enterprise system may consider identity confidence values on a rejection risk curve to be of greater importance than a corresponding identity confidence value on a confirmation confidence curve. Accordingly, despite an above threshold identity confidence value for a target user on a confirmation confidence curve 1110, such an enterprise system may deny access to the target user on the basis of a rejection risk curve 1120.

In an alternate embodiment, a rejection risk curve may represent a risk associated with a user's behavior activities. For example, a target user may be determined to be behaving different from their past behavior (e.g., using different doors from what they had in the past or behaving differently from the peers). Because such variations in behavior may represent a risk or at least a potential risk, a rejection risk curve may be generated using a trained machine learning model, a rule-based system, an external risk management system, or a combination thereof.

The confirmation confidence curve 1110 is evaluated based on a comparison against an operational security threshold 1130. Increasing identity scores on the confirmation confidence curve represent an increasing confidence in the target user's identity, whereas increasing risk scores on the rejection risk curve represent an increasing confidence that the target user's identity is incorrect (e.g., a decreasing confidence in the target user's identity) or that they are engaging in abnormal behavior. In some implementation, for example the implementation illustrated in FIG. 11A, the rejection risk curve 1120 may be evaluated against multiple conditional thresholds such as a first threshold 1140 and a second threshold 1150. For identity confidence values on the rejection risk curve 1120 above the threshold 1140, a target user may be flagged for manual review by an administrator of the operational context or enterprise system. Based on the results of the manual review, the target user may or may not be granted access. In addition, they may be flagged for future observations. For identity confidence values on the rejection risk curve 1120 above the threshold 1150, a user may be denied access too or locked out of an access despite having an identity confidence value on the confirmation confidence curve 1110 that is higher than the threshold 1130.

In a second implementation illustrated in FIG. 11B, the identity verification system 130 may process a confirmation confidence curve 1110 and a rejection risk curve 1120 in combination to generate a holistic confidence curve 1130. Each identity value on the confirmation confidence curve 1110 and each identity value on the rejection risk curve may be assigned a weight which is factored into a holistic identity value on the holistic confidence curve 1130. Each holistic identity value may be determined by aggregating values on each curve 1110 and 1120, for example an average or weighted average, and each weight may be tuned based on the preferences or requirements of an enterprise system. A holistic confidence value on the curve 1160 may be compared to an operational security threshold. Accordingly, holistic confidence values determined to be above the threshold result in a target user being granted access, whereas holistic confidence values determined to be below the threshold result in a target user being denied access.

As described with reference to FIG. 11A, the confirmation confidence curve 1110 is compared against an operational security threshold 1130 and the rejection risk curve 1120 is compared against thresholds 1140 and 1150. However, the holistic confidence curve 1160 is compared against a combination of thresholds 1130, 1140, and 1150. In the illustrated embodiment of FIG. 11B, increasing identity confidence values on the holistic confidence curve 1160 indicate an increasing confidence in the target user's identity. Accordingly, if an identity confidence value for a target user initially exceeds the threshold 1130 to enable access to an operational context, the identity confidence value may decay. As the identity confidence value decays below the threshold 1130, the target user may be flagged for review by an administrator of the operational context. As the identity confidence value continues to decay below threshold 1140, the target user may be locked out of the operational context.

The implementation of multiple conditional thresholds enables the enterprise system to respond to varying levels of confidence or varying levels of risk with different approaches tailored to the confidence or risk level. In the embodiment illustrated in FIG. 11A, if identity confidence values on the rejection risk curve 1120 increase above the threshold 1140, a potential risk notification may be communicated to an administrator via a dashboard on a computing device or to an external risk management system affiliated with the operational context. In the embodiment illustrated in FIG. 11B, a similar response may be elicited based on a decay of identity confidence values on the holistic confidence curve 1160 below the threshold 1140. In the embodiment illustrated in FIG. 11A, if identity confidence values on the rejection risk curve 1120 increase above the threshold 1150, a user may be locked out of the operational context for an indefinite or predetermined amount of time or until they confirm with high confidence their identity using a secondary authentication mechanism. In the embodiment illustrated in FIG. 11B, a similar response may be elicited based on a decay of identity confidence holistic values below the threshold 1150.

Computing Machine Architecture

Figure 12:
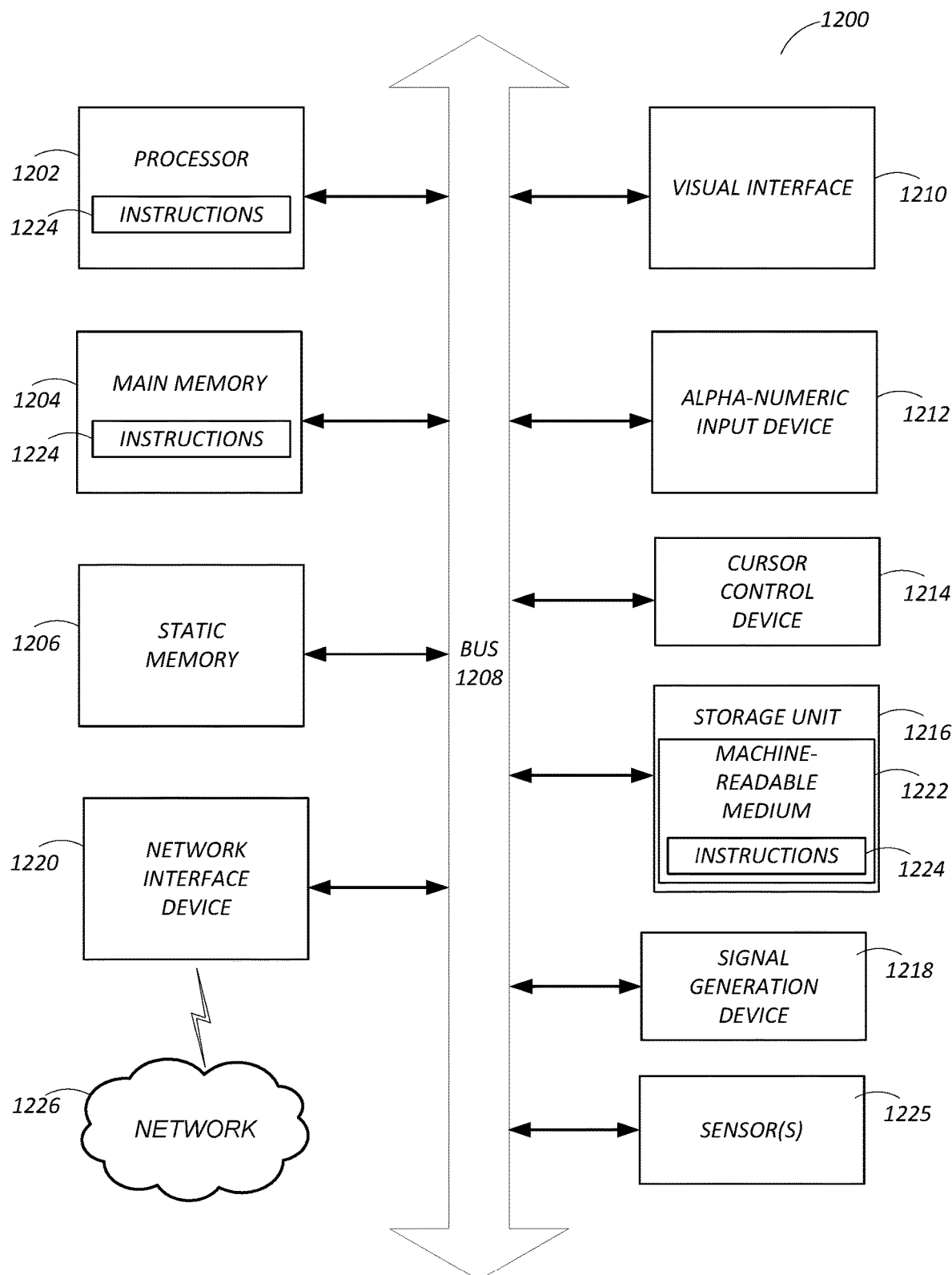
FIG. 12 is a block diagram illustrating components of an example machine able to read instructions from a machine-readable medium and execute them in a processor (or controller), according to one embodiment.

FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the processes or (methodologies) discussed herein (e.g., with respect to FIGS. 1-11) may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, an IoT device, a wearable, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include visual display interface 1210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1210 may include or may interface with a touch enabled screen. The computer system 1200 may also include alphanumeric input device 1212 (e.g., a keyboard or touch screen keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208. It is noted that the example computer system 1100 need not include all the components but may include a subset.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Benefits

The disclosed identity verification system 130 enables enterprise systems to track and evaluate a user's access to an operational context in real-time. Compared to conventional systems which determine a user's access at a single point in time, the described identity verification system continuously verifies a user's identity based on motion data recorded by a mobile device or a combination of other sources. Because characteristics of a user's movement and activities are unique to individual users, the identity verification system 130 is able to accurately verify a user's identity with varying levels of confidence. Additionally, by leveraging motion data recorded for a user, the identity verification system 130 may not be spoofed or hacked by someone attempting to access the operational context under the guise of another user's identity. Moreover, by continuously comparing a confidence identity value for a user to a threshold specific to an operational context, the enterprise system may revoke or maintain a user's access.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for confirming an identity of a particular user based on motion data received from various sources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising stored computer-readable instructions that, when executed by one or more processors, cause the one or more processors to:
    identify a target user requesting access to an operational context assigned an operational security threshold at a particular time, wherein the target user performs an action to request access;
    access a machine-learned model trained based on training data representing the action of performed by the target user;
    input data representing the action to the machine-learned model to generate an identity confidence value describing a probability that the action was performed by the target user;
    determine a decayed identity confidence value by applying a set of decay parameters to the identity confidence value, wherein the set of decay parameters are determined based on the operational context and the decayed identity confidence value represents a confidence in an identity of the target user at the particular time; and
    grant the target user access to the operational context responsive to determining the decayed identity confidence value to be greater than the operational security threshold.

2. The non-transitory computer-readable medium of claim 1, further comprising stored instructions that cause the one or more processors to:
    receive data representing a plurality of actions performed by the target user;
    identify, from data, a plurality of identity blocks, wherein each identity block of the plurality of identity blocks represents a different action performed by the target user;
    encode a set of signature sequences from each identity block of the plurality of identity blocks, the set of signature sequences representing data collected over a time period; and
    input the set of signature sequences into the machine-learned model.

3. The non-transitory computer-readable medium of claim 2, wherein instructions to identify the plurality of identity blocks further comprise instructions that cause the one or more processors to:
    divide the received data into a plurality of segments of equal lengths of time;
    input each segment of the plurality of segments into a machine-learned motion classification model to output a movement classification for the segment;
    identify, between a first segment of the plurality of segments with a first motion classification and a second segment of the plurality of segments with second motion classification, a motion discontinuity; and
    generate an identity block comprising motion data between each motion discontinuity and an immediately preceding motion discontinuity.

4. The non-transitory computer-readable medium of claim 1, wherein instructions to determine the decayed identity confidence value further comprise instructions that cause the one or more processors to:
    determine the decayed identity confidence value by applying a decay function to the identity confidence value to model a decay of the identity confidence value over a time period when data representing actions by the target user was collected;
    compare continuously, for the time period, the decayed identity confidence value to the operational security threshold; and
    request a secondary authentication mechanism to confirm the identity of the target user responsive to the decayed identity confidence value decaying below the operational security threshold.

5. The non-transitory computer-readable medium of claim 1, further comprise stored instructions that cause the one or more processors to:
    generate a request for a secondary authentication mechanism to determine a secondary identity confidence value for the target user responsive to determining the identity confidence value is less than the operational security threshold;
    generate an aggregate confidence value based on a combination of the identity confidence value and the secondary identity confidence value; and
    grant the target user access to the operational context responsive to determining the aggregate confidence value to be greater than the operational security threshold.

6. The non-transitory computer-readable medium of claim 1, further comprise stored instructions that cause the processor to:
    receive, for a sequence of actions performed by the target user, a decayed identity confidence value for each action;
    combine the decayed identity confidence value for each action of the sequence of actions into a continuous identity curve, wherein the continuous identity curve represents a confidence that the target user engaged in the sequence of actions; and grant the target user access to the operational context responsive to determining a point on the continuous identity curve to be greater than the operational security threshold.

7. The non-transitory computer-readable medium of claim 1, wherein the machine-learned model is a source-specific model trained based on data collected from a specific source, wherein the specific source is one of:
- motion data sensors;
- wi-Fi signals;
- GPS signals;
- keyboard inputs;
- mouse inputs; and
- battery information.

8. A method comprising:
- identifying a target user requesting access to an operational context assigned an operational security threshold at a particular time, wherein the target user performs an action to request access;
- accessing a machine-learned model trained based on training data representing the action of performed by the target user;
- inputting data representing the action to the machine-learned model to generate an identity confidence value describing a probability that the action was performed by the target user;
- determining a decayed identity confidence value by applying a set of decay parameters to the identity confidence value, wherein the set of decay parameters are determined based on the operational context and the decayed identity confidence value represents a confidence in an identity of the target user at the particular time; and
- granting the target user access to the operational context responsive to determining the decayed identity confidence value to be greater than the operational security threshold.

9. The method of claim 8, further comprising:
- receiving data representing a plurality of actions performed by the target user;
- identifying, from data, a plurality of identity blocks, wherein each identity block of the plurality of identity blocks represents a different action performed by the target user;
- encoding a set of signature sequences from each identity block of the plurality of identity blocks, the set of signature sequences representing data collected over a time period; and
- inputting the set of signature sequences into the machine-learned model.

10. The method of claim 9, further comprising:
- dividing the received data into a plurality of segments of equal lengths of time;
- inputting each segment of the plurality of segments into a machine-learned motion classification model to output a movement classification for the segment;
- identifying, between a first segment of the plurality of segments with a first motion classification and a second segment of the plurality of segments with second motion classification, a motion discontinuity; and
- generating an identity block comprising motion data between each motion discontinuity and an immediately preceding motion discontinuity.

11. The method of claim 8, wherein determining the decayed identity confidence value further comprises:
- determining the decayed identity confidence value by applying a decay function to the identity confidence value to model a decay of the identity confidence value over a time period when data representing actions by the target user was collected;
- comparing continuously, for the time period, the decayed identity confidence value to the operational security threshold; and
- requesting a secondary authentication mechanism to confirm the identity of the target user responsive to the decayed identity confidence value decaying below the operational security threshold.

12. The method of claim 8, further comprising:
- generating a request for a secondary authentication mechanism to determine a secondary identity confidence value for the target user responsive to determining the identity confidence value is less than the operational security threshold;
- generating an aggregate confidence value based on a combination of the identity confidence value and the secondary identity confidence value; and
- granting the target user access to the operational context responsive to determining the aggregate confidence value to be greater than the operational security threshold.

13. The method of claim 8, further comprising:
- receiving, for a sequence of actions performed by the target user, a decayed identity confidence value for each action;
- combining the decayed identity confidence value for each action of the sequence of actions into a continuous identity curve, wherein the continuous identity curve represents a confidence that the target user engaged in the sequence of actions; and
- granting the target user access to the operational context responsive to determining a point on the continuous identity curve to be greater than the operational security threshold.

14. The method of claim 8, wherein the machine-learned model is a source-specific model trained based on data collected from a specific source, wherein the specific source is one of:
- motion data sensors;
- wi-Fi signals;
- GPS signals;
- keyboard inputs;
- mouse inputs; and
- battery information.

15. A system comprising:
- a plurality of sensors configured to record a target user performing an action to request access to an operational context assigned an operational security threshold at a particular time, each sensor configured to record the target user an action of a plurality of actions;
- an identity computation module configured to:
  - access a machine-learned model trained based on training data representing the action of performed by the target user;
  - input data representing the action to the machine-learned model to generate an identity confidence value describing a probability that the action was performed by the target user; and
  - determine a decayed identity confidence value by applying a set of decay parameters to the identity confidence value, wherein the set of decay parameters are determined based on the operational context and the decayed identity confidence value represents a confidence in an identity of the target user at the particular time; and a confidence evaluation module configured to grant the target user access to the operational context responsive to determining the decayed identity confidence value to be greater than the operational security threshold.

16. The system of claim 15, further comprising an identity block generator configured to:
   receive data representing a plurality of actions performed by the target user;
   identify, from data, a plurality of identity blocks, wherein each identity block of the plurality of identity blocks represents a different action performed by the target user;
   encode a set of signature sequences from each identity block of the plurality of identity blocks, the set of signature sequences representing data collected over a time period; and
   input the set of signature sequences into the machine-learned model.

17. The system of claim 16, further comprising an identity block generator configured to:
   divide the received data into a plurality of segments of equal lengths of time;
   input each segment of the plurality of segments into a machine-learned motion classification model to output a movement classification for the segment;
   identify, between a first segment of the plurality of segments with a first motion classification and a second segment of the plurality of segments with second motion classification, a motion discontinuity; and
   generate an identity block comprising motion data between each motion discontinuity and an immediately preceding motion discontinuity.

18. The system of claim 15, wherein the identity computation module is further configured to:
   determine the decayed identity confidence value by applying a decay function to the identity confidence value to model a decay of the identity confidence value over a time period when data representing actions by the target user was collected;
   compare continuously, for the time period, the decayed identity confidence value to the operational security threshold; and
   request a secondary authentication mechanism to confirm the identity of the target user responsive to the decayed identity confidence value decaying below the operational security threshold.

19. The system of claim 15, wherein the confidence evaluation module is further configured to:
   generate a request for a secondary authentication mechanism to determine a secondary identity confidence value for the target user responsive to determining the identity confidence value is less than an operational security threshold;
   generate an aggregate confidence value based on a combination of the identity confidence value and the secondary identity confidence value; and
   grant the target user access to the operational context responsive to determining the aggregate confidence value to be greater than the operational security threshold.

20. The system of claim 15, wherein the identity computation module is further configured to:
   receive, for a sequence of actions performed by the target user, a decayed identity confidence value for each action;
   combine the decayed identity confidence value for each action of the sequence of actions into a continuous identity curve, wherein the continuous identity curve represents a confidence that the target user engaged in the sequence of actions; and
   grant the target user access to the operational context responsive to determining a point on the continuous identity curve to be greater than the operational security threshold.

* * * * *